(12) United States Patent
Ibrahim et al.

(10) Patent No.: US 11,414,353 B2
(45) Date of Patent: Aug. 16, 2022

(54) ROOM TEMPERATURE CURED GREEN CONCRETE DERIVED FROM NATURAL POZZOLAN AND NANOSILICA

(71) Applicant: KING FAHD UNIVERSITY OF PETROLEUM AND MINERALS, Dhahran (SA)

(72) Inventors: Mohammed Ibrahim, Dhahran (SA); Mohammed Maslehuddin, Dhahran (SA); Muhammed Kalimur Rahman, Dhahran (SA); Hatim Mohamad Dafallah, Dhahran (SA); Megat Azmi Megat Johari, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/391,685

(22) Filed: Apr. 23, 2019

(65) Prior Publication Data
US 2020/0339477 A1    Oct. 29, 2020

(51) Int. Cl.
| | |
|---|---|
| *C04B 28/26* | (2006.01) |
| *C04B 40/06* | (2006.01) |
| *C04B 14/14* | (2006.01) |
| *B28B 1/14* | (2006.01) |

(52) U.S. Cl.
CPC ............. *C04B 28/26* (2013.01); *C04B 14/14* (2013.01); *C04B 40/065* (2013.01); *B28B 1/14* (2013.01)

(58) Field of Classification Search
CPC ....... C04B 14/06; C04B 14/062; C04B 14/14; C04B 20/008; C04B 28/006; C04B 28/26; C04B 40/065; C04B 2103/0088; C04B 2111/1037; B28B 1/14; Y02P 40/10
See application file for complete search history.

(56) References Cited

U.S. PATENT DOCUMENTS

| | | | |
|---|---|---|---|
| 9,321,687 B2 | 4/2016 | Gupta et al. | |
| 9,834,479 B2 | 12/2017 | Gong et al. | |
| 2012/0156381 A1 | 6/2012 | Allouche et al. | |
| 2014/0264140 A1 | 9/2014 | Gong et al. | |
| 2016/0214900 A1* | 7/2016 | Pisklak | C09K 8/467 |
| 2021/0323869 A1* | 10/2021 | Bawri | C04B 28/06 |

FOREIGN PATENT DOCUMENTS

| | | | | |
|---|---|---|---|---|
| CN | 106746982 A | * | 5/2017 | ............. C04B 28/00 |
| CN | 107746212 A | * | 3/2018 | ............. C04B 28/00 |
| CN | 107902945 A | * | 4/2018 | ............. C04B 24/42 |
| CN | 108529925 A | * | 9/2018 | ............. C04B 28/04 |
| CN | 108892424 A | * | 11/2018 | ............. C04B 28/00 |
| KR | 10-1773961 B1 | | 9/2017 | |

OTHER PUBLICATIONS

N.L.N. Kiran Kumar, et al., "Effects of Nano Silica on the Strengths of Geopolymer Concrete Cured at Ambient Temperature", International Journal of Civil Engineering and Technology (IJCIET), vol. 8, Issue 8, Aug. 2017, pp. 437-444.

Pradip Nath, et al., "Geopolymer concrete for ambient curing condition", Proceedings of the Australasian Structural Engineering Conference (ASEC): The Past, Present and Future of Structural Engineering, Conference Paper, 2912, pp. 225-232.

Mohammed Ibrahim, et al., "Influence of nano-$SiO_2$ on the strength and microstructure of natural pozzolan based alkali activated concrete", Construction and Building Materials, vol. 173, 2018, pp. 573-585.

Mohammad R. Irshidat, et al., "Feasibility of producing sustainable geopolymer composites made of locally available natural pozzolan", Journal of Material Cycles and Waste Management, vol. 20, Issue 3, May 8, 2018, pp. 1751-1760.

Mohammed Ibrahim, et al., "Effect of alkaline activators and binder content on the properties of natural pozzolan-based alkali activated concrete", Construction and Building Materials, vol. 147, Aug. 30, 2017, pp. 648-660 (Abstract only).

Mohammed Ibrahim, et al., "Effect of NaOH Molarity on ths Strength and Microstructure of Natural Pozzolan-Based AAC", MATEC Web of Conferences, International Conference on Civil, Offshore & Environmental Engineering 2018 (ICCOEE), vol. 203, 2018, pp. 1-8.

Mohammed Ibrahim, et al., "Enhancing the engineering properties and microstructure of room temperature cured alkali activated natural pozzolan based concrete utilizing nanosilica", Construction and Building Materials, vol. 189, 2018, pp. 352-365.

\* cited by examiner

*Primary Examiner* — Anthony J Green
(74) *Attorney, Agent, or Firm* — Oblon, McClelland, Maier & Neustadt, L.L.P.

(57) ABSTRACT

A green concrete and mortar compositions free of Portland cement are disclosed. The compositions comprise Natural pozzolan, nanosilica particles, and alkaline activator. The green concrete produced from the composition of the invention is cured at ambient temperature and has higher compressive strength than that of concrete made with Portland cement.

20 Claims, 15 Drawing Sheets

Figure 6A
Figure 6B
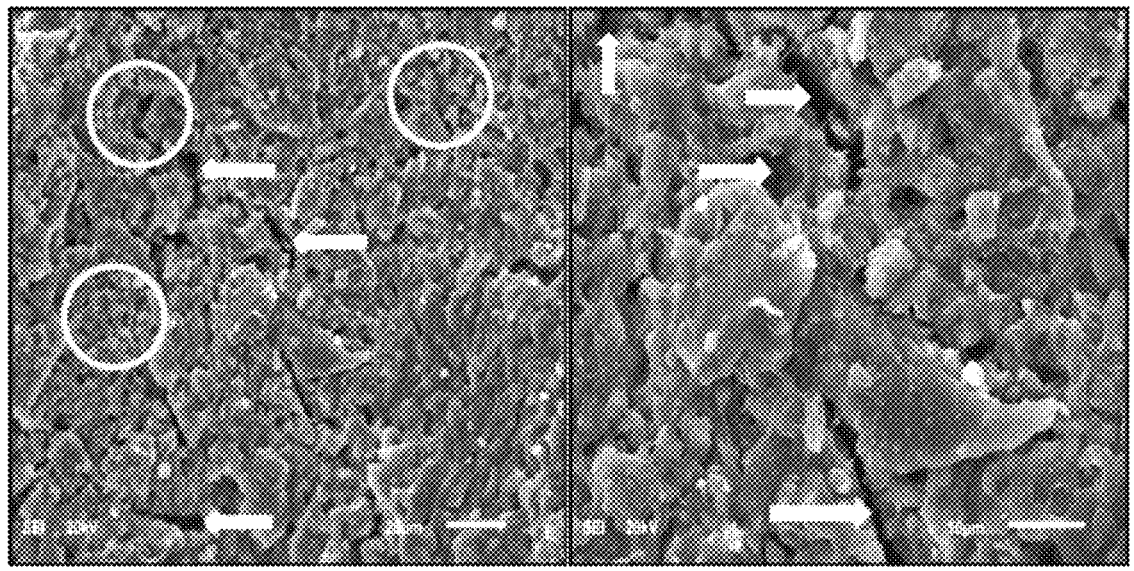
Figure 7A
Figure 7B
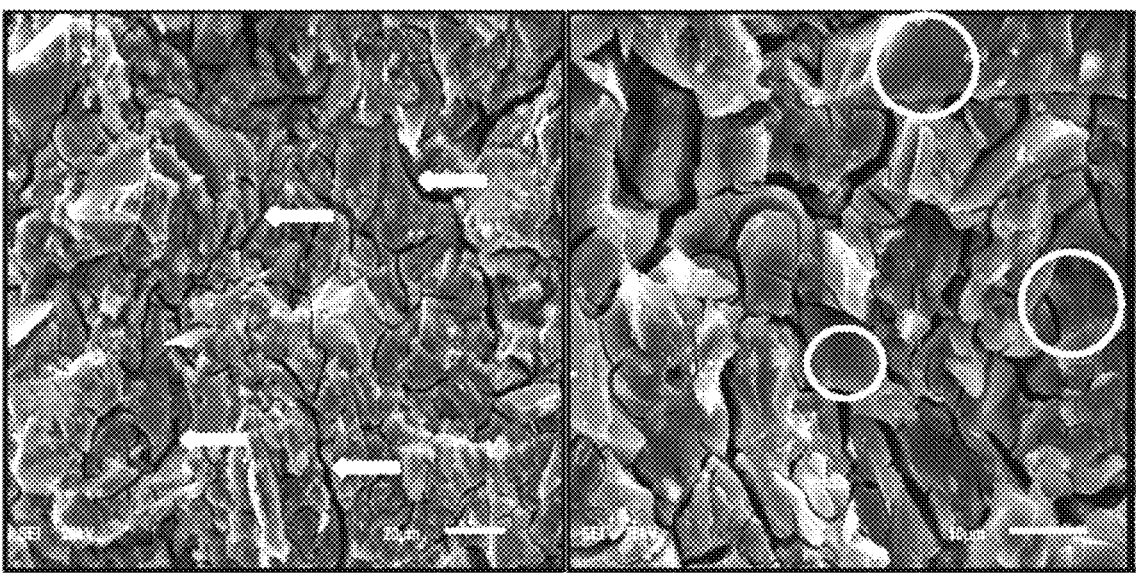

Figure 8A
Figure 8B
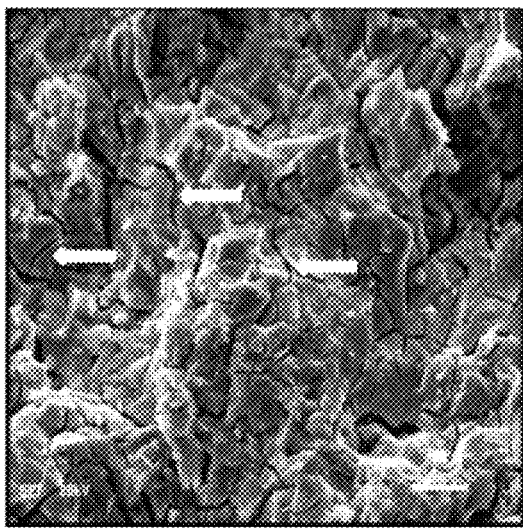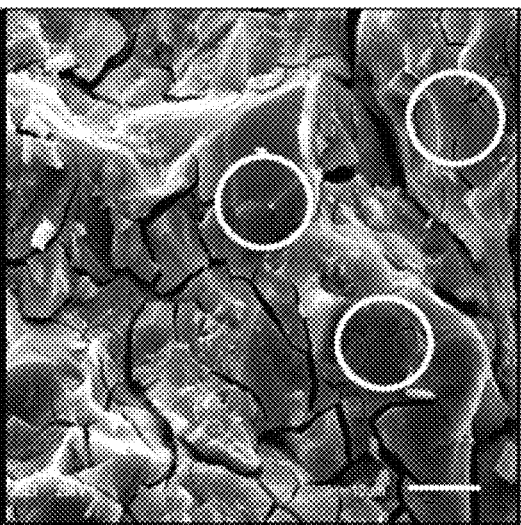
Figure 9A
Figure 9B
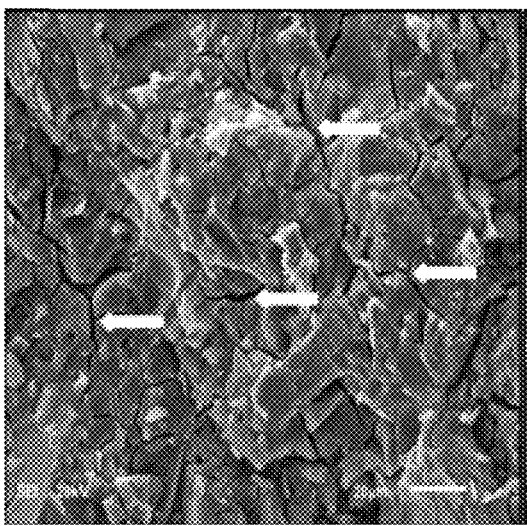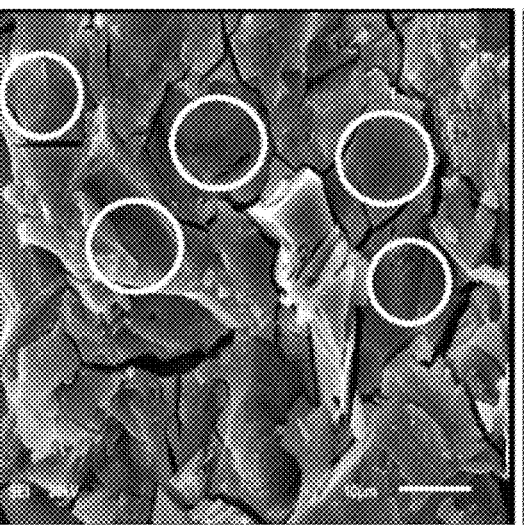

Figure 10A    Figure 10B
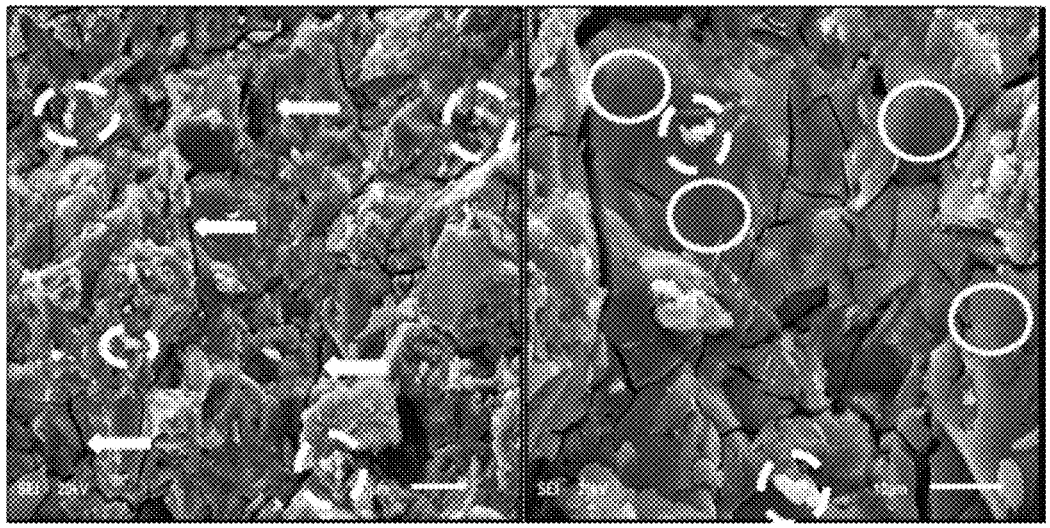
Figure 11A    Figure 11B
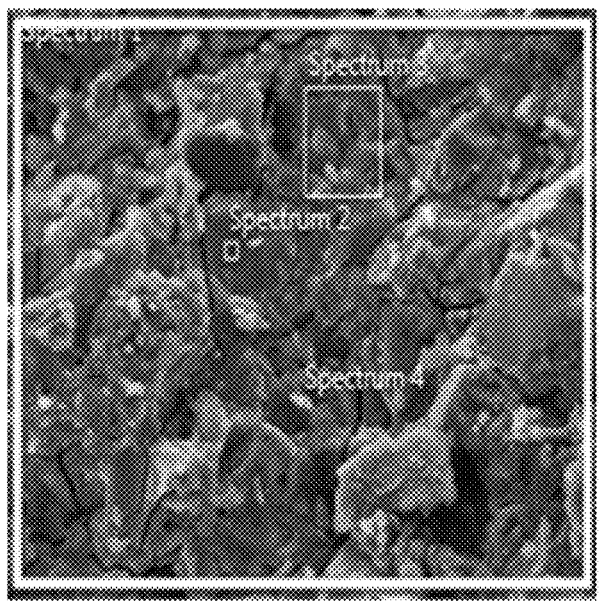
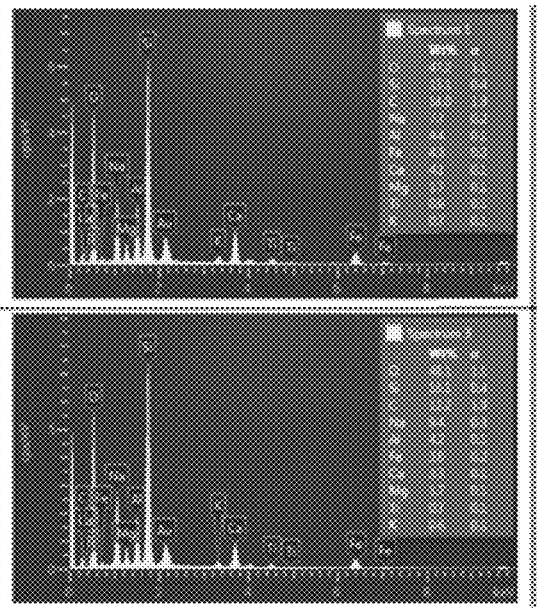

Figure 12A
Figure 12B
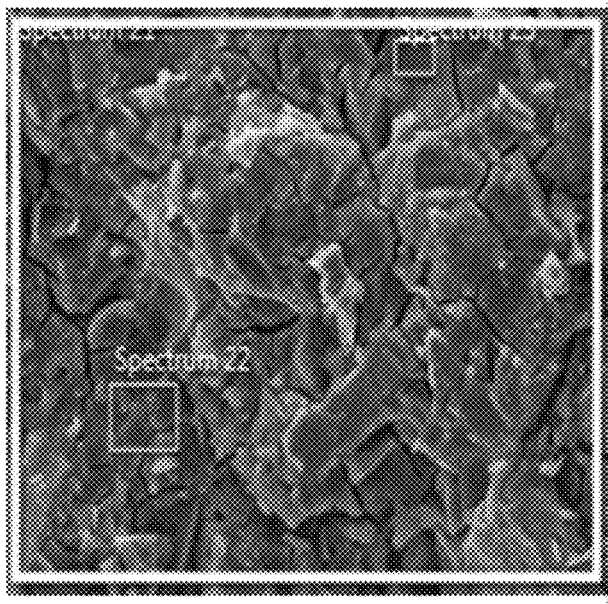
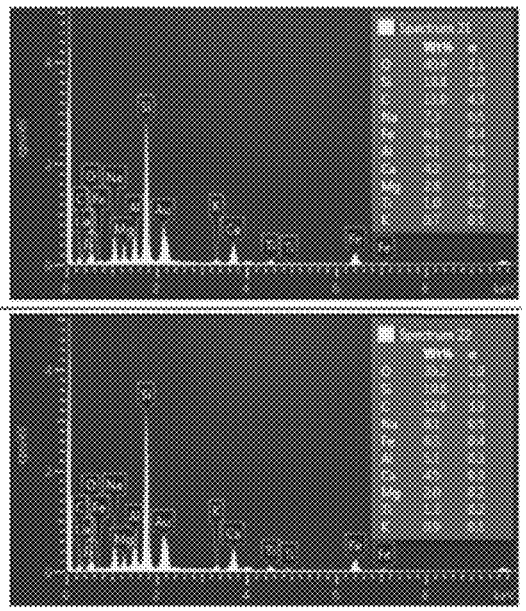
Figure 13A
Figure 13B
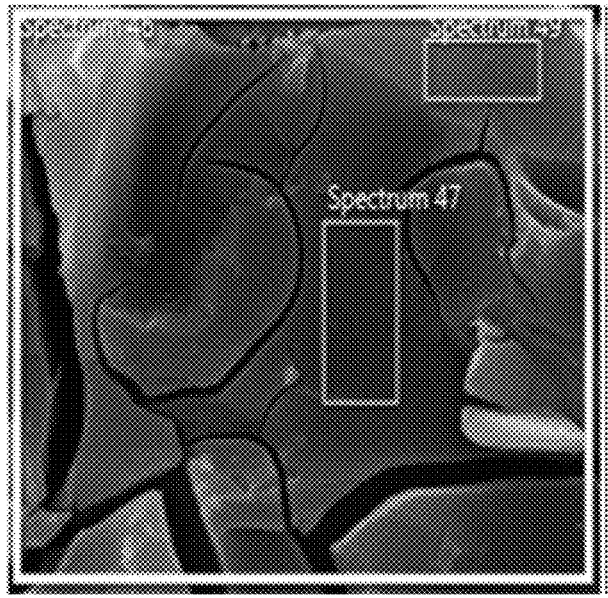
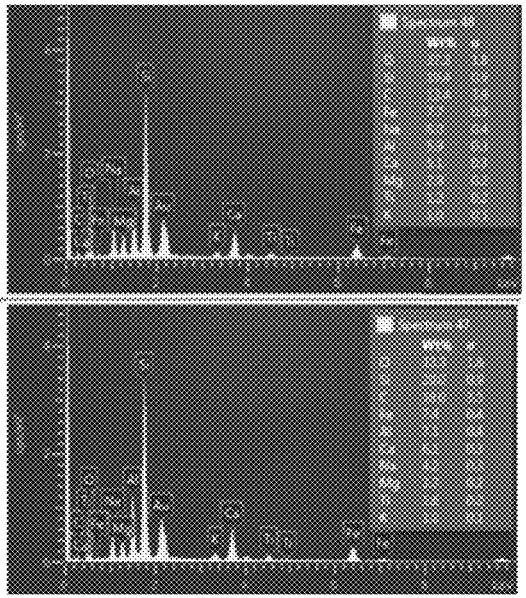

ROOM TEMPERATURE CURED GREEN CONCRETE DERIVED FROM NATURAL POZZOLAN AND NANOSILICA

STATEMENT REGARDING PRIOR DISCLOSURE BY THE INVENTORS

Aspects of this technology are described in articles "Influence of nano-SiO2 on the strength and microstructure of natural pozzolan based alkali activated concrete" published in Construction and Building Materials, 2018, 173, 573-585, on Apr. 24, 2018; and "Enhancing the engineering properties and microstructures of room, temperature cured alkali activated natural based concrete utilizing nanosilica", published in Construction and Building Materials, 2018, 189, 352-365, on Sep. 11, 2018, each of which is incorporated herein by reference in its entirety.

STATEMENT OF ACKNOWLEDGEMENT

This research work was supported by the Center for Engineering Research (CER) of Research Institute, King Fahd University of Petroleum and Minerals (KFUPM), Dhahran, Saudi Arabia; and School of Civil Engineering, University Sains Malaysia, Engineering Campus, Pulau Pinang, Malaysia.

BACKGROUND OF THE INVENTION

Field of the Disclosure

The present invention relates to a Portland cement-free green concrete and mortar mix comprising silicon dioxide nanoparticles, alkaline activator, and natural pozzolan.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

As the population of the world is growing, so is the demand for construction of new buildings and infrastructure. The primary material utilized in the construction of buildings and facilities to meet the demands of growing populations is ordinary Portland cement (OPC) which is being used to produce concrete worldwide. Production of OPC used in the construction industry is unfortunately associated with emission of $CO_2$, a greenhouse gas. Every ton of Portland cement produced contributes about a ton of $CO_2$ both directly through the heat of decomposition of calcium carbonate to produce lime and $CO_2$, and indirectly through burning fossil fuel to heat the calcium carbonate in the kilns [Mehtha, P. K. "*Reducing the Environmental Impact of Concrete*" ACI Concrete international, 23(10), pp. 61-66; and Malhotra, V. M. "Making Concrete Greener with Fly Ash," ACI Concrete International, 21, pp. 61-66].

As the global need for the construction of new houses increases, there will be increasing in the demand for concrete worldwide forcing the use of alternative binders. Currently, OPC is being partially replaced by natural materials and industrial byproducts in the production of concrete, which has resulted in improving the quality of concrete [Maslehuddin et al. "Corrosion of Reinforcing Steel in Concrete Containing Slag or Pozzolans" ASTM Journal of Cement, Concrete and Aggregates, Vol. 12, No. 1, 1990, pp. 24-31; Al-Amoudi et al. "Prediction of Long-Term Corrosion Resistance of Plain and Blended Cement Concretes" ACE Materials Journal, Vol. 90. No. 6, November 1993, pp. 564-570; and Saricimen et al "Permeability and Durability of Plain and Blended Cement Concretes Cured in Field and Laboratory Conditions" ACI Materials Journal, Vol. 9, No. 2, 1995, pp. 111-116—each incorporated herein by reference in their entirety]. It is highly unlikely that use of Portland cement in the production of concrete can be avoided in the foreseeable future, but it can be certainly curtailed by using alternative binders. In this regard, a new class of binder is emerging. As an attractive alternative to OPC, alkali activated binder (AAB) is developed utilizing industrial byproducts [Davidovits, J. "Global Warming Impact en the Cement and Aggregates Industries" World Resource Review, vol. 6, no. 2, pp. 263-278, 1994; and Davidovits, J. "Chemistry of Geopolymeric Systems Terminalogy," Paper Presented at Geopolymer 99. International Conference, Saint Quentin, France, 1999—each incorporated herein by reference in their entirety]. So far, fly ash has been utilized extensively in producing alkali activated concrete (AAC), also known as green concrete. However, strength development of such a concrete depends on several factors including: concentration of the alkaline materials, curing temperature, and chemical composition as well as fineness of source material. Further, development of the concrete strength is sluggish at ambient temperature due to the slow polymerization process which has become a major impediment for its practical application. Such a limitation can be overcome by incorporating materials with large specific surface area to improve reactivity, when cured at lower temperatures. In this regard nanomaterials, such as nano-$SiO_2$, having large specific surface area can be beneficial in improving strength development.

Ibrahim et al. [Const. Build. Mat. (2017) 147, 648-660; and MATEC Web of Conferences 203, 06017 (2018)—each of which incorporated herein by reference in its entirety] examine the effect of alkaline activators such as sodium hydroxide and sodium silicate on the properties of pozzolan-based alkali activated concrete. They reported that natural pozzolan was activated with sodium silicate to sodium hydroxide ratio in the range of 2.0 to 2.75 using 14 M solution of sodium hydroxide. Also, they reported that the binder composition had significant effect on the properties of the alkali activated concrete.

US20140264140A1 discloses a Portland cement-free binder comprising one or more Class F fly ash material as cementitious material, one or more gelation enhancers, and one or more hardening enhancers in addition to a foaming agent. The gelation enhancer is selected from metakaolin, metahalloysit, macro- or nanosilica and alumina, and a pozzolanic aluminosilicate material having a low alkali-earth metal oxide.

U.S. Pat. No. 9,834,479B2 discloses a geopolymer concrete mix comprising one or more fly ash material, one or more gelation enhancer, and one or more hardening enhancer that is different from the fly ash material.

U.S. Pat. No. 9,321,687B2 discloses a method of making a low concentration alkali fly ash cement comprising forming a mixture of Class C fly ash and aqueous solution comprising alkali at a molar concentration in the range of 0.002 M and 0.2 M to form low concentration alkali fly ash cement.

US20120156381A1 discloses a geopolymer formed by mixing an amount of pozzolanic material in the range of 34% to 46% by weight, alkaline activator in an amount in the range of 15% to 20%, and copper ion source in an amount in the range of 0.3% to 2.5%. The pozzolanic material could be a fly ash or metakaolin and the silicon dioxide is sand.

KR177396B1 discloses a cement-free binder comprises 70-85 wt. % fly ashes, 12-27 wt. % calcium oxide, and 3-10 wt. % calcium chloride.

Nath et al. [https:-//espace.curtin.edu.au/handle/20.500.11937/44567] disclose a fly-ash based geopolymer concrete suitable for ambient curing condition that may also contain ground blast furnace slag.

Kumar et al. [Int. J. Civil Engin. Tech. (201) 8 (8) 437-444] examine the effects of nanosilica in fly ash based geopolymer. In particular, they disclose a composition comprising a blend of low-calcium fly ash, blast furnace slag, and varying amount of colloidal nanosilica.

Irshidat et al. [J. Mat. Cyc. Wate Mang. (2-18)—incorporated herein by reference in its entirety] examine the total replacement binder with natural pozzolanic material by varying parameters such as sand/pozzolan ratio, water/pozzolan ratio, type and concentration of activator, presence of soluble silicates, and curing age.

It is one objective of the present disclosure to provide a green Portland cement-free mortar and concrete compositions comprising silicon dioxide nanoparticles, alkaline activator, and natural pozzolan.

SUMMARY

A first aspect of the invention is directed to a Portland cement-free green concrete and mortar mix compositions comprising:
silicon dioxide nanoparticles,
alkaline activators, and
natural pozzolan.

In a preferred embodiment, the amount of silicon dioxide oxide nanoparticles of the green composition is in the range of 0.5 wt. % to 10 wt. % of the total weight of the natural pozzolan.

In a more preferred embodiment, the amount of the silicon dioxide nanoparticles is in the range 4 wt. % to 8 wt. % of the total weight of the pozzolan.

In another preferred embodiment, the silicon dioxide nanoparticles have an average size in the range of 10 nm to 500 nm.

In another preferred embodiment, the silicon dioxide nanoparticles have an average surface area, in the range of 20 $m^2/g$ to 150 $m^2/g$.

In another preferred embodiment, the alkaline activators are alkali metal silicate and alkali metal hydroxide.

In another preferred embodiment, the weight ratio of the alkali silicate to the alkali hydroxide is in a range of 2.4:1 to 2.7:1.

In another preferred embodiment, the alkali metal silicate is sodium silicate.

In another preferred embodiment, the alkali metal hydroxide is sodium hydroxide.

In another preferred embodiment, the green mortar or concrete composition has a weight percentage of the alkali hydroxide ranging from 1.5-5% relative to a total weight of the alkali activated concrete composition.

In another preferred embodiment, the green mortar or concrete composition has a weight percentage of the alkali silicate ranging from 5-10% relative to a total weight of the green concrete composition.

In another preferred embodiment, the green mortar or concrete composition has a weight percentage of the natural pozzolan ranging from 8-20% relative to a total weight of green concrete composition.

In another preferred embodiment, the green mortar or concrete composition further comprises fine and coarse aggregates.

In another preferred embodiment, the fine aggregate comprises sand having a specific gravity of 2.2-3.2.

In another preferred embodiment, the coarse aggregate comprises crushed limestone having a specific gravity of 2.1-3.0.

In another preferred embodiment, the weight ratio of the coarse aggregate to the fine aggregate is in a range of 3:1 to 1:1.

A second aspect of the invention is directed to wet concrete slurry, comprising:
the green concrete composition; and water,
wherein a weight ratio of the water to the alkali activated concrete composition is in a range of 1: 5 to 1: 25.

A third aspect of the invention is directed to a method of producing a green concrete comprising:
casting the wet concrete slurry in a mold to form a casted wet concrete; and
curing the casted wet concrete for 1-90 days thereby foaming the alkali activated concrete.

A fourth aspect of the invention is directed to a two-component concrete kit, comprising:
(a) a concrete package comprising:
a natural pozzolan;
a fine aggregate comprising sand; and
a coarse aggregate comprising course aggregate, and
(b) an alkali package comprising an alkali hydroxide and an alkali silicate.

In a preferred embodiment, the natural pozzolan comprises 35-50 wt % of $SiO_2$, 10-25 wt % of $Fe_2O_3$, 5-15 wt % of $Al_2O_3$, and 8-15 wt % of CaO, each relative to a total weight of the natural pozzolan; and a weight ratio of the alkali silicate to the alkali hydroxide is in a range of 2:1 to 3:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will he readily obtained as the same becomes better understood by reference to the following detailed description when considered in connection with the accompanying drawings, wherein:

FIG. 6A shows a SEM micrograph at 1× magnification of NP-based alkaline activated past (AAP), circles showing non-uniform gel, arrows pointing out voids and cracks.

FIG. 6B shows a SEM micrograph at 2.5× magnification of NP-based AAP, arrows pointing out voids and cracks.

FIG. 7A shows a SEM micrograph at 1× magnification of NP-based AAP incorporating 1% NS, white arrows show fine cracks.

FIG. 7B shows a SEM micrograph at 2.5× magnification of NP-based AAP incorporating 1% NS, white circles uniform gel.

FIG. 8A shows a SEM micrograph at 1× magnification of NP-based AAP incorporating 2.5% NS, white arrows show fine cracks.

FIG. 8B shows a SEM micrograph at 2.5× magnification of NP-based AAP incorporating 2.5% NS, circles uniform gel.

FIG. 9A shows a SEM micrograph at 1× magnification of NP-based AAP incorporating 5% NS, arrows point to fine cracks.

FIG. 9B shows a SEM micrograph at 2.5× magnification of NP-based AAP incorporating 5% NS, circles uniform gel.

FIG. 10A shows a SEM micrograph at magnification 1× of NP-based AAP incorporating 7.5% NS, broken circles unreacted particles, and arrow point to fine cracks.

FIG. 10B shows a SEM micrograph at magnification 2.5× of NP-based AAP incorporating 7.5% NS, solid circles areas of uniform gel and broken circles unreacted particles.

FIG. 11A shows a SEM micrograph, rectangular marks distinct features selected for elemental compositions by EDS of NP-based AAP.

FIG. 11B shows EDS of NP-based AAP obtained from the selected area of the micrograph of FIG. 11A.

FIG. 12A shows a SEM micrograph, rectangular marks distinct features selected for elemental compositions by of NP-based AAP modified with 1% NS.

FIG. 12B shows EDS of NP-based AAP obtained from the selected area of the micrograph of FIG. 12A.

FIG. 13A shows a SEM micrograph, rectangular marks distinct features selected for elemental compositions by of NP-based AAP modified with 2.5% NS.

FIG. 13B shows EDS of NP-based AAP obtained from the selected area of the micrograph of FIG. 13A.

DETAILED DESCRIPTION

Figure 1:
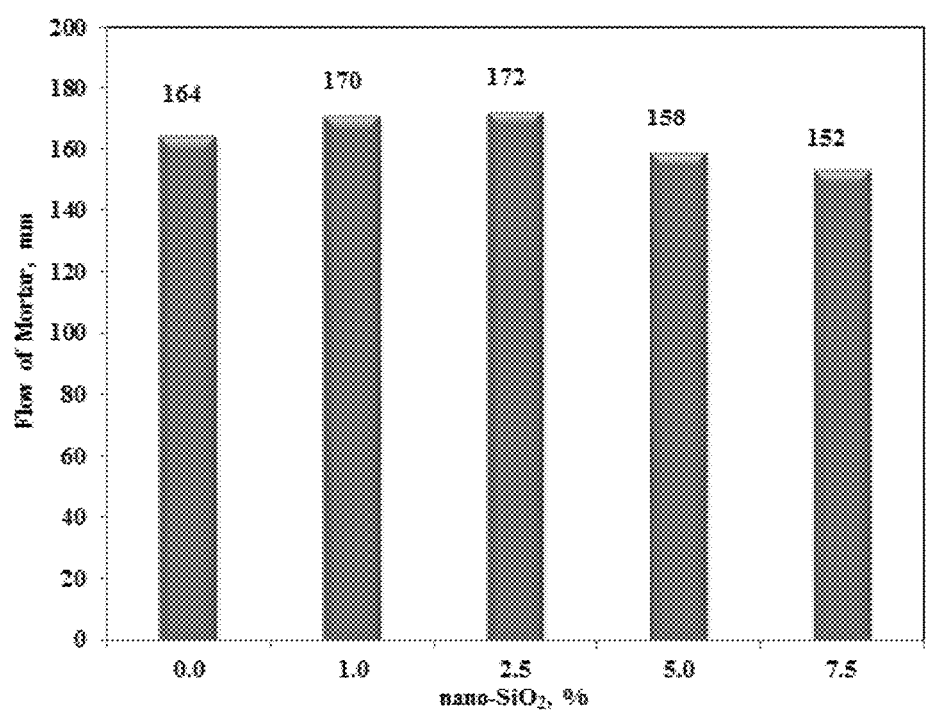
FIG. 1 illustrates the flow of alkali activated mortar prepared with natural pozzolan and nano-$SiO_2$.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more".

As used herein, the term "setting" is used herein to describe the hardening of a cement paste.

As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

A first aspect of the invention is directed to a Portland cement-free green concrete composition comprising silicon oxide nanoparticles, alkaline activator, and natural pozzolan. Portland cement is a basic ingredient of traditional concrete, mortar, stucco, and/or non-specialty grout. It is a fine powder and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). The process of manufacturing Portland cement produces large amount of carbon dioxide which is a greenhouse gas contributing to global warming. The alkali activated concrete composition of the invention is a green concrete composition utilizing an abundantly available naturally pozzolan as a binder and does not contain any amount of any kind of Portland cement.

As used herein the terms "nanosilica", "nano-SiO$_2$," or "silica nanoparticles" are used interchangeably and refer to silicon dioxide nanoparticles having an average size in the range of 10 nm to 500 nm, preferably in the range of 20 nm to 200 nm, more preferably in the range of 25 nm to 100 nm, and most preferably in the range of 25 nm to 50 nm. In a particularly preferred embodiment, the average size of the nanosilica is about 35 nm. The nanosilica used in the composition may have a surface area in the range of 20 m$^2$/g to 200 m$^2$/g, preferably in the range of 40 m$^2$/g to 150 m$^2$/g, more preferably in the range of 60 m$^2$/g to 100 m$^2$/g, and most preferably about 80 m$^2$/g. Nanosilica particles are divided into P-type and S-type according to their structure. The P-type particles are characterized by numerous nanopores having a pore rate of 0.61 ml/g. The S-type particles have a comparatively smaller surface area. The composition of the invention may contain nanosilica particles of type-P, Type-S, or combination thereof in a powder form or aqueous or organic solvent colloidal solution.

In some embodiments, solid nanosilica particles used in the green concrete composition of the invention are produced from solutions of silicon oxides, e.g., colloidal dispersions of solid silicon nanoparticles in liquid media, especially solutions of amorphous, semi-crystalline, and/or crystalline silica. Such solutions can be prepared by a variety of techniques and in a variety of forms, which include hydrosols (where water serves as the liquid medium), organosols (where organic liquids serve as the liquid medium), and mixed sols (where the liquid medium comprises both water and an organic liquid). See for example, the descriptions of the techniques and forms given in U.S. Pat. Nos. 2,801,185; 4,522,958; and 5,648,407—each incorporated herein by reference in its entirety. Solid nanosilica particles can be commercially obtained as colloidal dispersions or solutions dispersed. A predispersed nano-$SiO_2$ colloid can be used and the nanosilica particles may have any shape, including solid or hollow spherical and oblong, and substantially non-aggregated. The nanosilica may he stabilized in the composition of the invention with a metal oxide, such as lithium oxide, sodium oxide, potassium oxide, and/or a combination thereof. Other known stabilizers of nanosilica are amines and/or a metal oxide as mentioned above. In some embodiments of the invention, the colloidal nanosilica solution/composition/suspension comprises solid nanosilica particles in the range of 20 wt. % to 75 wt. %, preferably in the range 30 wt. % to 65 wt. %, preferably in the range of 40 wt. % to 60 wt. %, preferably 45 wt. % to 55 wt. % and preferably about 50 wt. % of the total weight of the colloidal nanosilica solution.

As used herein, natural pozzolans are siliceous or aluminosiliceous materials such as volcanic ashes, calcined clays, and shale. Pozzolans react chemically with alkali hydroxide such as, but not limited to alkali metal or alkaline earth metal calcium hydroxides to form compounds such as metal silicate hydrates possessing cementitious properties. Natural pozzolans include those described in co-pending U.S. patent application Ser. No. 16/290,314 ('314)—incorporated herein by reference in its entirety. Natural pozzolan is available, in many parts of the world, including a 100,000 $km^2$ area in Saudi Arabia along the Red Sea coast [M. R. Moufti, A. A. Sabtan, O. R. El-Mandy and W. M. Shehata, "Preliminary Geologic and Engineering Assessment of the Pyroclastic Deposits in the Central Part of Harrat Rahat," Journal of King Abdul Aziz University, Earth Sciences, Vol. 11. pp. 59-88, 1999, incorporated herein by reference in its entirety].

While the chemical composition of the natural pozzolan may from one geographical location to another and from one geological formation to another, any natural pozzolan from any geographical location or geological formation may be used in the composition of the invention.

Basalt is a mafic extrusive igneous rock formed from the rapid cooling of magnesium-rich and iron-rich lava exposed to or very near the surface of a terrestrial planet or a moon. More than 90% of all volcanic rock on earth is basalt. Ground basalt, rock is the natural pozzolan used in the invention. Typical natural pozzolans include basaltic rock from different locations such as but not limited to Columbia, Germany, and Egypt, and may contain up to 40 wt % of $SiO_2$, preferably up to 50 wt. %, preferably up to 60 wt. %, preferably up to 62 wt. % of $SiO_2$ relative to a total weight of the natural pozzolan. The chemical composition of examples of natural pozzolans obtained from several locations is summarized in Table 1 below.

TABLE 1

Comparison of oxide compositions of natural pozzolan (NP) of different origins

| Component | NP from east of Saudi Arabia | NP of Colombian origin | NP of German origin | NP of Iranian origin |
|---|---|---|---|---|
| $SiO_2$ | 40.48% | 61.17% | 57.1% | 61.67% |
| $Al_2O_3$ | 12.90% | 16.57% | 16.90% | 15.90% |
| $Fe_2O_3$ | 17.62% | 5.81% | 6.10% | 4.32% |
| CaO | 11.83% | 2.86% | 4.90% | 7.99% |

In one or more embodiments, the natural pozzolan used herein exemplified by ground basalt rock collected from the Saudi Arabia Red Sea coast comprises 35-50 wt % of $SiO_2$, preferably 37-45 wt % of $SiO_2$, more preferably 39-42 wt % of $SiO_2$, or about 40.5 wt % of $SiO_2$ relative to a total weight of the natural pozzolan. In at least one embodiment, the amount of $SiO_2$ present in the natural pozzolan used herein is less than 60 wt %, preferably less than 57 wt %, preferably less than 52 wt % relative to a total weight of the natural pozzolan.

In some embodiments, natural pozzolans including basaltic rock from locations such as, but not limited to, Columbia, Germany, Egypt, and Saudi Arabia contain $Fe_2O_3$ in an amount in the range of 2-25 wt %, preferably in the range of 3-22 wt %, more preferably in the range of 5-19 wt %, even more preferably in range of 10-18 wt %, and most preferably about 17.5 wt % relative to a total weight of the natural pozzolan. In other embodiments, the natural pozzolan is obtained for example from grinding basalt rock collected from the Saudi Arabia Red Sea coast. In at least one embodiment, the amount of $Fe_2O_3$ present in the natural pozzolan used herein is greater than 10 wt %, preferably greater than 12 wt %, preferably greater than 15 wt % relative to a total weight of the natural pozzolan.

In a related embodiment, the natural pozzolan used herein comprises 2-18 wt % of CaO, preferably 3-15 wt %, more preferably 5-13 wt %, and most preferably 7-12 wt % relative to a total weight of the natural pozzolan. In a particularly preferred embodiment, the natural pozzolan comprises about 11.8 wt % relative to a total weight of the natural pozzolan. In at least one embodiment, the amount of CaO present in the natural pozzolan is greater than 5 wt %, preferably greater than 6 wt %, preferably greater than 7 wt % relative to a total weight of the natural pozzolan. In another related embodiment, the natural pozzolan used herein comprises 5-20 wt % of $Al_2O_3$, preferably 8-18 wt % of $Al_2O_3$, more preferably 10-15 wt % of $Al_2O_3$, or about 13 wt % of $Al_2O_3$ relative to a total weight of the natural pozzolan. In at least one embodiment, the natural pozzolan used herein may comprise substantially no sulfate, for instance, less than 0.1 wt % of sulfate, preferably less than 0.05 wt %, more preferably less than 0.01 wt % of sulfate, relative to a total weight of the natural pozzolan. In at least one embodiment, the natural pozzolan used herein is devoid of sulfate. The oxide compositions of natural pozzolan collected from different sources may differ significantly.

The particle size and amorphousness of a pozzolan may impact its pozzolan reactivity. In one or more embodiment, the natural pozzolan used herein has a particle size in a range of 0.1-100 μm, preferably 0.5-80 μm, preferably 1-60 μm, preferably 5-40 µm, preferably 10-20 µm. The amorphous character of the pozzolans may be determined by X-ray diffraction (XRD), and transmission electron microscopy (TEM). In some embodiments, the natural pozzolan used herein contains amorphous silica, amorphous alumina, and/or amorphous iron oxide.

In one or more embodiments, the alkali activated green concrete composition has a weight percentage of the natural pozzolan ranging from 8-20% relative to a total weight of the dry uncured composition, preferably 9-19%, preferably 10-18%, preferably 11-17%, preferably 12-16% relative to the total weight of the alkali activated concrete composition The strength development of alkali activated green concrete (AAC) relies on factors including curing temperature, concentrations of alkaline materials, as well as chemical composition and fineness of precursor materials. Among these factors, a chemical composition having sufficient quantities of minerals such as $SiO_2$, $Al_2O_3$ and CaO is crucial for robust AACs. However, natural pozzolans from the sources mentioned (e.g. Saudi Arabia) may not contain adequate amounts of these oxides. Durable AAC may be produced from natural pozzolans via fortification with a mineral-rich material to optimize the chemical composition. The alkali activated concrete composition disclosed herein utilizes the aforementioned natural pozzolan for improved strength.

Alkali activated materials may be obtained by chemical reactions of mineral powder rich in alumina silica and/or calcium that becomes soluble in alkali activator solutions. The formation of cementitious material may be based on heterogeneous reactions involving reactive aluminosilicate rich materials under alkaline conditions that yield sodium aluminosilicate glass.

Exemplary alkali hydroxides include, but are not limited to, sodium hydroxide, potassium hydroxide, lithium hydroxide, rubidium hydroxide, cesium hydroxide, and mixtures thereof. In a preferred embodiment, the alkali hydroxide of the present disclosure is sodium hydroxide. It is equally envisaged that the currently disclosed alkali activated concrete may be adapted to include other metal hydroxides such as calcium hydroxide, magnesium hydroxide, strontium hydroxide, and barium hydroxide. Alternatively, carbonates such as sodium carbonate, potassium carbonate, and calcium carbonate may be used in addition to, or in lieu of the hydroxides. In a preferred embodiment, the alkali activated concrete composition has a weight percentage of the alkali hydroxide ranging from 1-5% relative to a total weight of the composition, preferably 1.5-4%, preferably 1.8-3.5%, preferably 2-3%, preferably 2.2-2.5% relative to the total weight of the alkali activated concrete composition.

Exemplary alkali silicates include, but are not limited to, sodium silicate, potassium silicate, lithium silicate, and mixtures thereof. In a preferred embodiment, the alkali silicate of the present disclosure is sodium silicate. Sodium silicate is a generic name for a family of chemical compounds with a formula $mSiO_2 \cdot nNa_2O$ where a silica modulus (i.e. molar ratio of $SiO_2$ to $Na_2O$, or m:n) is in a range from 0.5 to 3.6, preferably from 1 to 3.5, preferably from 2 to 3.4, preferably from 3 to 3.35, or about 3.3. Non-limiting examples of sodium silicate include sodium metasilicate ($Na_2SiO_3$), sodium metasilicate pentahydrate ($Na_2SiO_3 \cdot 5H_2O$), sodium metasilicate nonahydrate ($Na_2SiO_3 \cdot 9H_2O$), sodium orthosilicate ($Na_4SiO_4$), and sodium pyrosilicate ($Na_6Si_2O_7$). In a preferred embodiment, the alkali activated concrete composition has a weight percentage of the alkali silicate ranging from 4-10% relative to a total weight of the composition, preferably 4.5-9%, preferably 5-8%, preferably 5.5-7%, preferably 6-6.5% relative to the total weight of the alkali activated concrete composition.

In one or more embodiments, a weight ratio of the aforementioned alkali silicate to the alkali hydroxide is in a range of 2:1 to 3:1, preferably 2.1:1 to 2.9:1, preferably 2.2:1 to 2.8:1, preferably 2.3:1 to 2.7:1, preferably 2.4:1 to 2.6:1, or about 2.5:1. The alkali activator involving the alkali silicate and the alkali hydroxide may be incorporated as an aqueous solution, dry powder (anhydrous), or as a combination of both. Amounts of the alkali activator described herein are calculated as dry content. Aqueous alkali activator may be obtained as a commercial product or by mixing water with the dry alkali activator.

The alkali activated green concrete composition of the present disclosure may comprise aggregates. As used herein, "construction aggregate" or simply "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small exposed pores to irregular with small to large exposed pores. Particle shape and surface texture of both fine and coarse aggregates may influence proportioning of mixtures in such factors as workability, pumpability, fine-to-coarse aggregate ratio, and water requirement.

In one or more embodiments, the alkali activated concrete composition of the present disclosure comprises a fine aggregate. In one embodiment, the fine aggregate used herein has an average particle size in a range of 0.05-2.0 mm, preferably 0.1-1.0 mm, preferably 0.2-0.6 mm, preferably 0.3-0.5 mm. In a preferred embodiment, the fine aggregate used herein has a specific gravity of 2.0-3.5, preferably 2.2-3.2, preferably 2.4-3.0, preferably 2.6-2.8. As used herein, water absorption refers to the penetration of water into aggregate particles with resulting increase in particle weight. In one embodiment, the alkali activated concrete composition of the present disclosure comprises a fine aggregate having a water absorption of 0.1-1.0%, preferably 0.2-0.8%, preferably 0.4-0.6%. In a preferred embodiment, the alkali activated concrete composition has a weight percentage of the fine aggregate ranging from 15-35% relative to the total weight of the composition, preferably 18-32%, preferably 20-30%, preferably 22-28%, preferably 24-26% relative to the total weight of the alkali activated concrete composition.

In a preferred embodiment, the fine aggregate is sand, more preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). In a preferred embodiment, the fine aggregate of the alkali activated concrete composition is dune sand with a specific gravity of 2.2-3.2, preferably 2.4-3.0. more preferably 2.5-2.7, or about 2.6.

In one or more embodiments, the alkali activated green concrete composition of the present disclosure comprises a coarse aggregate. In one embodiment, the coarse aggregate used herein has an average particle size in a range of 2-20 mm, preferably 4-15 mm, preferably 6-13 mm, preferably 8-12 mm. In a preferred embodiment, the coarse aggregate used herein has a specific gravity of 2.0-3.0, preferably 2.2-2.9, preferably 2.4-2.8, preferably 2.5-2.7. In one embodiment, the concrete composition of the present disclosure comprises a coarse aggregate having water absorption of 0.4-4.0%, preferably 0.6-2.0%, preferably 0.8-1.5%. In a preferred embodiment, the concrete composition has a weight percentage of the coarse aggregate ranging from 35-65% relative to the total weight of the composition, preferably 38-60%, preferably 40-55%, preferably 42-50%, preferably 45-48% relative to the total weight of the concrete composition.

In a preferred embodiment, the course aggregate present in the concrete composition is crushed limestone. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluses. Crushed limestone is generated during the crushing and grinding of limestone rocks. The crushed limestone used herein may have an average particle size greater than 1 mm. In one embodiment, the crushed limestone has an average particle size of 1.5-32 mm, preferably 2-30 mm, preferably 4-28 mm, preferably 6-24 mm, preferably 8-20 mm, preferably 10-18 mm, preferably 12-16 mm. The crushed limestone may contain materials including, but not limited to, calcium carbonate, silicon dioxide, quartz, feldspar, clay minerals, pyrite, siderite, chert and other minerals. In a most preferred embodiment, the coarse aggregate of the alkali activated concrete composition is crushed limestone with a specific gravity of 2.1-3.0, preferably 2.2-2.8, more preferably 2.4-2.7, or about 2.56.

It is equally envisaged that the alkali activated green concrete composition of the present disclosure may be adapted to comprise other coarse aggregates. Exemplary coarse aggregates that may be used in addition to, or in lieu of crushed limestone include, but are not limited to, natural coarse aggregates such as scoria, perlite, vermiculite, diatomite, schists, expanded schist and the like and mixtures thereof, and synthetic coarse aggregates comprising polymers such as polypropylene polyethylene, polystyrene, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like and copolymers and mixtures thereof.

In one or more embodiments, a weight ratio of the aforementioned coarse aggregate to the fine aggregate is in a range of 3:1 to 1:1, preferably 2.5:1 to 1.2:1, preferably 2:1 to 1.5:1, or about 1.86:1. However, in certain embodiments, the weight ratio of the coarse aggregate to the fine aggregate may be less than 1:1 or greater than 3:1.

As used herein, the term "free water" is the total amount of water used in the concrete mix which includes the water from the alkali metal hydroxide and silicate preparations as well as any additional water added to the concrete mix. In one or more embodiment, the total free water to natural pozzolan weight ratio is in the range 0.15 to 0.35, preferably in the range of 0.2 to 0.3, and preferably about 0.25.

As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers a chemical admixture used herein to provide a well-dispersed particle suspension in the wet concrete slurry. The superplasticizer may be used to prevent particle segregation and to improve the flow characteristics of the wet concrete slurry. The addition of a superplasticizer during transit of concrete mortar and mix is a fairly new development within the industry. Admixtures added in transit through automated slump management systems allow concrete producers to maintain slump until discharge without reducing concrete quality. The superplasticizer may be a polycarboxylate, e.g. a polycarboxylate derivative with polyethylene oxide side chains, a polycarboxylate ether (PCE) superplasticizer, such as the commercially available Glenium 51®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain) grafted with methacrylic acid copolymer (main chain). Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

In some embodiments of the invention, the green concrete composition comprises superplasticizers in an amount in the range 0.05% to 0.7%, preferably in the range of 0.10 to 0.5%, more preferably in the range of 0.15% to 0.4%, and most preferably in the range of 0.15% to 0.3% by weight of the total weight of cement composition According to another embodiment, the present disclosure relates to a wet green concrete slurry involving the alkali activated concrete composition disclosed herein in any of its embodiments, and water. The water may be potable water, tap water, freshwater or seawater, and may be taken from a natural source, such as an aquifer, lake, or ocean, and may be filtered to remove large solids before using. In one or more embodiments, a weight ratio of the water to the alkali activated green concrete composition is in a range of 1:5 to 1:25, preferably 1:6 to 1:23, preferably 1:7 to 1:20, preferably 1:8 to 1:18, preferably 1:9 to 1:16, preferably 1:10 to 1:15, preferably 1:12 to 1:14. In general, the amount of water used in the wet concrete slurry would depend on the chemical composition of pozzolan and the job conditions at hand. Thus, in other embodiments, the weight ratio of the water to the alkali activated concrete composition is less than 1:5 or greater than 1:25. The amount of water used may vary over a wide range, depending upon factors such as the chemical natural pozzolan and the required consistency of the wet concrete slurry.

According to another aspect, the present disclosure relates to an alkali activated green concrete involving a dry cured form of the wet concrete slurry disclosed herein in any of its embodiments as well as a method of making the alkali activated concrete.

The alkali activated green concrete may be made by sequentially pouring different components into a concrete mixer (e.g. a paddle mixer, a drum mixer, a rotating mixer, a stand mixer). For example, the aforementioned alkali activated green concrete composition including the natural pozzolan, nano-$SiO_2$, the line aggregate, and the coarse aggregate may be dry-mixed in a concrete mixer for a time period ranging from 30 seconds-30 minutes, 60 seconds-20 minutes, or 3-10 minutes. Preferably, mixing the natural pozzolan, nano-$SiO_2$, the fine aggregate, and, the coarse aggregate forms a homogeneous dry mixture.

Following the dry mixing process, an alkali activator solution comprising the alkali hydroxide and the alkali silicate dissolved in water may be added to the dry mixture to form wet green concrete slurry. The alkali activator solution may be slowly poured into the concrete mixer while the concrete mixer turns the dry mixture for a time period ranging from 1-10 minutes. 2-8 minutes, or 3-6 minutes thereby forming a wet concrete mixture. Preferably, the alkali activator solution is mixed into the dry mixture for a time period of about 3 minutes. Alternatively, the alkali hydroxide and the alkali silicate may be dry-mixed in the aforementioned steps to form a dry mixture, and water may be added to the dry mixture containing the alkali activator to form the wet concrete slurry.

The wet green concrete slurry containing the natural pozzolan, nano-$SiO_2$, the fine aggregate, the coarse aggregate, water, the alkali hydroxide, and the alkali silicate may be cast into a mold at a temperature of 10-40° C., preferably 15-35° C., more preferably 20-27° C. thereby forming a cast wet concrete. The wet green concrete slurry may be compacted in the mold by using a steel rod or a trowel. In one embodiment, the casted wet concrete may be cured for a time period of 1-7 days, 2-6 days, or 3-5 days and then removed from the mold, which results in a green alkali activated concrete.

The alkali activated green concrete may be left to further cure for a length of time necessary to achieve a desired mechanical property, such as a desired compressive strength. Preferably the alkali activated green concrete, left to cure, will harden with a mechanical strength (e.g. compressive strength or tensile strength) that increases over the curing time. However, strength will reach a maximum value within a certain time of curing, for example, within 90 days, preferably within 56 days, preferably within 28 days. In one embodiment, the green alkali activated concrete may be left to further cure for a time period of 3-180 days, preferably 7-130 days, more preferably 28-90 days, most preferably about 180, though in certain embodiments, the alkali activated green concrete may be considered cured in less than 0.5 day or after 30 days. The green alkali activated concrete of the invention is cured at an ambient temperature in a temperature range of 0-50° C., 10-40° C., or 20-35° C. Methods of preparing and curing wet concrete slurries are generally known to those skilled in the art.

As used herein, a unit weight, also known as "specific weight", is the weight per unit volume of a material. The unit weight of the alkali activated green concrete may vary depending on the chemical composition of the pozzolan used and other component which may be added to the composition. In some embodiments, the alkali activated green concrete described herein has a unit weight of 2,000-2650 kg/m$^3$, preferably 2,100-2,550 kg/m$^3$, preferably 2,200-2,500 kg/m$^3$, preferably 2,300-2,450 kg/m$^3$. However, in certain embodiments, the alkali activated concrete may have a unit weight smaller than 2,000 kg/m$^3$, or greater than 2,700 kg/m$^3$. In one embodiment, the unit weight of the alkali activated concrete is determined by ASTM C138.

As defined herein, compressive strength is the capacity of a material or structure to withstand compressive loads, as opposed to tensile strength, which is the capacity of a material or structure to withstand tensile loads. The Portland cement-free green concrete composition of the invention has a lower compressive strength than a concrete comprising Portland cement in the early stages of curing period for up to 14 days. Then, the green concrete of the invention acquires significantly more compressive strength compared to that of the Portland cement containing concrete after curing period of 25 to 200 days. In some embodiment, the green concrete of the invention has compressive strength that is at least 5%, preferably, 20%, more preferably 35%, even more 55%, and most preferably 60% greater than that of Portland cement concrete. In one embodiment, the compressive strength of the alkali activated green concrete is determined by ASTM C109. In one or more embodiments, the alkali activated green concrete described herein has an early-stage compressive strength after about 14 days of 10-35 MPa, preferably 15-30 MPa, preferably 17-20 MPa. In one or more embodiments, the alkali activated green concrete described herein has a late-stage compressive strength of 30-80 MPa, preferably 40-75 MPa, preferably 50-70 MPa, preferably 55-65 MPa determined after further curing for 50 to 200 days.

As defined herein, flexural strength is a concrete property, defined as the stress in a concrete just before it yields in a flexure test. The transverse bending test is most frequently employed, in which a specimen having either a circular or rectangular cross-section is bent until fracture or yielding using a three point flexural test technique. The flexural strength represents the highest stress experienced within the concrete at its moment of yield. It is measured in terms of stress. In one or more embodiments, the alkali activated green concrete described herein has an early-stage flexural strength after about 28 days of 3-10 MPa, preferably 4-9 MPa, preferably 5-8 MPa. In one or more embodiments, the alkali activated green concrete described herein has a late-stage flexural strength of 5-12 MPa, preferably 6-10 MPa, preferably 6-9 MPa, preferably 7-8 MPa determined after further curing for 50 to 200 days.

As defined herein, modulus of elasticity is a quantity that measures an object or substance's resistance to being deformed elastically, i.e., non-permanently, when a stress is applied to it. The modulus of elasticity of an object is defined as the slope of its stress-strain curve in the elastic deformation region: a stiffer material will have a higher modulus of elasticity. Modulus of elasticity is measured as the ratio of stress to strain. Stress is the force causing the deformation divided by the area to which the force is applied, and strain is the ratio of the change in some parameter caused by the deformation to the original value of the parameter. Since stress is measured in Pascals and strain is a dimensionless quantity, the unit modulus of elasticity is in Pascals. In one or more embodiments, the alkali activated green concrete described herein has an early-stage modulus of elasticity after about 28 days of 10-45 GPa, preferably 15-40 GPa, preferably 17-35 GPa, preferably 20-30 GPA. In one or more embodiments, the alkali activated green concrete described herein has a late-stage modulus of elasticity of at least 20 GPa, preferably at least 22 GPa MPa, preferably at least 24 GPa, determined after further curing for 50 to 200 days.

A second aspect of the invention relates to a two-component concrete kit involving a green concrete package and an alkali package. The green concrete package comprises a natural pozzolan, nanosilica particles, fine aggregates comprising sand, and a coarse aggregates comprising crushed limestone. The green concrete and alkali packages may be packed individually and physically separated prior to usage. The method of using the two-component green concrete kit to make an alkali activated green concrete may be similar to aforementioned steps starting from mixing the components in the green concrete and alkali packages to form a homogeneous dry mixture.

The chemical composition and physical properties of each component of the green concrete kit may be substantially similar to those described previously. For example, the natural pozzolan contains 35-62 wt % of $SiO_2$, preferably 35-50 wt % of $SiO_2$, more preferably 37-42 wt % of $SiO_2$, or about 40.5 wt % of $SiO_2$, 2.5-25 wt % of $Fe_2O_3$, preferably 3-22 wt % of $Fe_2O_3$, more preferably 5-19 wt % of $Fe_2O_3$, or about 17.5 wt % of $Fe_2O_3$, 2-18 wt % of CaO, preferably 3-15 wt % of CaO, more preferably 5-13 wt % of CaO, or about 11.8 wt % of CaO, 5-20 wt % of $Al_2O_3$, preferably 10-18 wt % of $Al_2O_3$, more preferably 12-15 wt % of $Al_2O_3$, or about 13 wt % of $Al_2O_3$, each relative to a total weight of the natural pozzolan.

In addition, weight ratios between the components present in the green concrete kit may be substantially similar to those mentioned previously. For example, a weight ratio of the alkali silicate to the alkali hydroxide in the alkali package is in a range of 2:1 to 3:1, preferably 2.1:1 to 2.9:1, preferably 2.2:1 to 2.8:1, preferably 2.3:1 to 2.7:1, preferably 2.4:1 to 2.6:1, or about 2.5:1.

Another aspect of the invention is directed to a Portland cement-free green mortar mix comprising natural pozzolan, nano-SiO2, alkaline activator. and fine aggregates. Mortar is a workable paste used to bind building blocks and/or aggregates such as stones, bricks, and concrete masonry units, to fill and seal irregular gaps between them. In many instances, mortar is modified to add decorative colors or patterns to masonry walls. In its broadest sense mortar includes pitch, asphalt, and soft mud or clay, such as used between mud bricks. The mortar becomes hard when it cures, resulting in a rigid aggregate structure; however the mortar is intended to be weaker than the building blocks and acts as a sacrificial element in the masonry because mortar is easier and less expensive to repair than the building blocks. Mortars are typically made from a mixture of fine aggregates, a binder, and water. The most common binder since the early 20th century is Portland cement. The green mortar of the invention substitutes all the Portland cement with natural pozzolan and nano-$SiO_2$. It is prepared by mixing the natural pozzolan, nano-$SiO_2$ alkaline activator, fine aggregates, such as dune sand, and water. In some embodiments, the mortar is prepared by mixing sand and binder comprising nanosilica particles, natural pozzolan, and alkaline activators in a ratio in the range of 1-2, preferably in the range 1.2 to 1.9, more preferably in the range of 1.4 to 1.8, and most preferably in the range of 1.5 to 1.7. The water may be added to a dry mixture of binder and sand and mixed in a mixer or the binder is mixed in water and the alkaline activator is added. The weight ratio of the water to the alkali activated green concrete composition is in a range of 1:5 to 1:25, preferably 1:6 to 1:23, preferably 1:7 to 1:20, preferably 1:8 to 1:18, preferably 1:9 to 1:16, preferably 1:10 to 1:15, preferably 1:12 to 1:14. In some other embodiments, the total free water to natural pozzolan weight ratio is in the range 0.15 to 0.35, preferably in the range of 0.2 to 0.3, and preferably about 0.25.

The examples below are intended to further illustrate protocols for preparing, characterizing the alkali activated concrete, and uses thereof, and are not intended to limit the scope of the claims.

EXAMPLES 1

Materials:

Natural Pozzolan and Nano Silica

Natural pozzolan (NP) used herein was a powdered volcanic rock, abundantly available on the western region of Saudi Arabia and nano-SiO2, aqueous dispersion of colloidal silica approximately 50% solids by mass. The chemical composition of NP determined by X-ray flourescence (XRF) technique is shown in Table 2. The specific surface area and average particle size of NP used are 442 $m^2$/kg and 30 μm respectively. Table 2 gives the physical properties of NP used in this study. Table 3 shows the properties of nano-$SiO_2$ (NS).

TABLE 2

Chemical composition of NP

| Oxides | $SiO_2$ | $Al_2O$ | $Fe_2O_3$ | CaO | MgO | $K_2O$ | $Na_2O$ | $P_2O_5$ | $TiO_2$ | LOI |
|---|---|---|---|---|---|---|---|---|---|---|
| wt. % | 40.48 | 12.90 | 17.62 | 11.83 | 8.33 | 1.67 | 3.60 | 1.37 | 0.60 | 1.6 |

TABLE 3

Physical properties of NS

| Property | Solid content % | Avg. Particle size nm | Bulk density g/cm³ | Specific surface area m²/g | $Na_2O$ content % | Viscosity cps | pH |
|---|---|---|---|---|---|---|---|
| Value | 50 | 35 | 1.4 | 80 | 0.2 | 15 | 9.5 |

TABLE 4

Physical properties of natural pozzolan

| Property | Value | [a]ASTM C618-10 requirement for Type N pozzolan |
|---|---|---|
| Fineness: Amount Retained when Wet-sieved on 45-μm (No. 325) Sieve, Max, % | 3.798 | 34 (max) |
| Strength Activity Index: with OPC, at 7 Days, Min % of Control | 80.14 | 75 (min) |
| Water Requirement, Max, % of Control | 105 | 115 (max) |
| Soundness: Autoclave Expansion or Contraction, Max, % | 0.274 | 0.8 (max) |

[a]ASTM C618-10, Standard Test Method for Flow of Hydraulic Cement Mortar, ASTM International, West Conshohocken, PA, 2010

Alkaline activators: The alkaline activators used herein were a combination of aqueous sodium silicate (SS), and 14 M sodium hydroxide (SH) solution. The silica modulus of sodium silicate was 3.3 and its composition was: $H_2O$: 62.50%, $SiO_2$: 28.75% and $Na_2O$: 8.75

Aggregates: Fine aggregate (FA) used was dune sand with a specific gravity of 2.62 in saturated surface dry condition. Crushed lime stone, having specific gravity of 2.56 was used as coarse aggregate.

EXAMPLES 2

Mixture Design and Samples Preparation

In order to determine the suitable composition of alkaline activators, trial mixtures having SS/SH ratios of 2.0, 2.5 and 2.75 were prepared with a combined activator silica modulus of 1.193, 1.367 and 1.444, and alkali content of $Na_2O$ was 8.435%, 7.888% and 7.668% of the binder content, respectively [Yusuf et al. M. "Impacts of silica modulus on the early strength of alkaline activated ground slag/ultrafine palm oil fuel ash based concrete" Mater. Struct. 48 (3) (2015) 733-741]. Table 5 shows the material constituents of trial mixtures without nano-$SiO_2$. Based on the compressive strength results obtained from the trials, the best performing mix was selected and the natural pozzolan was partially replaced with nano-$SiO_2$ from 1% to 7.5% by weight. Table 6 summarizes the constituent materials for preparing the alkali activated concrete (AAC) specimens incorporating nano-$SiO_2$. Since the nano-$SiO_2$ was colloidal in nature comprising 50% water and 50% solid, the weight replacing binder was the solid content of colloidal composition and the equivalent amount of water was adjusted in the mixing water. As the SS/SH ratio of 2.5 was selected for the mixes incorporating nano-$SiO_2$, the combined activator silica modulus of 1.367 and alkali content ($Na_2O$) of 7.888% of the binder were utilized. For setting time, SEM and XRD analysis, alkali activated paste (AAP) was prepared. As the nano-$SiO_2$ was colloidal in nature (50% water and 50% solid), the weight replacing binder was the solid content of it and the equivalent amount of water was adjusted in the mixing water. The coarse aggregate to total aggregate and fine aggregate to total aggregate ratios were 0.65 and 0.35, respectively. A free water to pozzolanic material ratio of 0.25 and alkaline activator to binder ratio of 0.525 was used in all the mixtures. Additionally, an OPC-based concrete was prepared using mix proportions generally used in the construction industry given in Table 7 to compare the strength development of AAC with OPC concrete

TABLE 5

Constituent materials for AAC trial mixtures without nano-$SiO_2$[a]

| Mix # | NP kg/m³ | SS kg/m³ | SH kg/m³ | Water kg/m³ | AA kg/m³ | SS/SH | FA kg/m³ | CA kg/m³ |
|---|---|---|---|---|---|---|---|---|
| MO-1 | 400 | 140 | 70 | 139.222 | 200 | 2.0 | 650 | 1206 |
| MO-2 | 400 | 150 | 60 | 139.51 | 200 | 2.5 | 650 | 1206 |
| Mo-3 | 400 | 154 | 56 | 139.63 | 200 | 2 | 650 | 1206 |

[a]Abbrivation: Natural pozzolan (NP), sodium silicate (SS), sodium hydroxide (SH), fine aggregate (FA), and coarse aggregate (CA).

TABLE 6

Constituent materials for AAC mixtures with colloidal nano-$SiO_2$[a]

| Mix # | NP kg/m³ | NS kg/m³ | SS kg/m³ | SH kg/m³ | Water kg/m³ | FA kg/m³ | CA kg/m³ |
|---|---|---|---|---|---|---|---|
| M0 | 400 | 0 | 150 | 60 | 139.51 | 650 | 1206 |
| M1 | 396 | 4 | 150 | 60 | 139.51 | 646 | 1200 |
| M2 | 390 | 10 | 150 | 60 | 139.51 | 640 | 1188 |
| M3 | 380 | 20 | 150 | 60 | 139.51 | 630 | 1170 |
| M4 | 370 | 30 | 150 | 60 | 139.51 | 620 | 1152 |

[a]Abbreviation: Natural pozzolan (NP), nano silica (NS), sodium silicate (SS), sodium hydroxide (SH), fine aggregate (FA), and coarse aggregate (CA).

TABLE 7

Constituent materials for OPC mix

| Mix # | OPC, kg/m³ | Coarse aggregate kg/m³ | Fine aggregate kg/m³ | Water, kg/m³ |
|---|---|---|---|---|
| M5 | 370 | 1198 | 645 | 167 |

Mixing the samples: The required quantities of SS and SH were mixed with water and, colloidal nano-$SiO_2$ was added subsequently to the mixture. The nano-$SiO_2$ was dispersed uniformly in the mixture by sonication for 10 minutes using a high intensity ultrasonic processor (VCX 500). For preparing AAC specimens, the required quantities of coarse and fine aggregates were measured and placed in an approximately 20.0 L capacity Hobart mixer and thoroughly mixed prior to the addition of natural pozzolan. Wet mixing followed with the addition of liquid content. Each substance added to the bowl was mixed approximately for three minutes such that the total mixing time was about 8 to 10 minutes to ensure the homogeneity of the mixture. Subsequently, the concrete was placed in the molds in two layers and each layer was vibrated for 30 seconds to remove the entrapped air from the mixture. Then the surface was carefully smoothened with a trowel to have a smooth finish. After the placement, consolidation, and finishing of concrete, the specimens were covered with a plastic sheet to prevent moisture loss and kept in the laboratory maintained at 25±2° C. for 24 hours before being de-molded.

Curing:
(a) Curing at room temperature: After 24 hours of casting, specimens were de-molded, placed in plastic bags to avoid evaporation of moisture, and kept in the laboratory that was maintained at 23+2° C. until the predetermined curing period. OPC concrete was cured under wet burlap.
(b) Curing at 60° C.: After 24 h of casting, the specimens were de-molded, placed in plastic bags to avoid evaporation of moisture, and kept in the oven maintained at 60° C. AAP was cured for seven days in the oven after which mineralogical, and morphological studies were carried out.

EXAMPLES 2

Testing Concrete Mixes

Setting times and workability: The initial and final setting times of AAP, with and without nano-$SiO_2$, were determined in accordance with ASTM C191. The workability in terms of flow of mortar prepared with sand to binder ratio of 1.625 was determined in accordance with ASTM 01437 [ASTM C1437-10, Standard Specification for Coal Fly Ash and Raw or Calcined Natural Pozzolan for Use in Concrete, *ASTM*

*International*, West Conshohocken, Pa., 2010]. To ensure the accuracy of results three specimens for each mix were prepared and tested.

FIG. 1 shows the flow of alkali activated mortar. Average flow of mortar was about 163 mm. In the mixtures prepared with higher nano-$SiO_2$ content, flow of mortar was marginally less as compared to the ones prepared with lower ones. Due to the colloidal nature of the nano-$SiO_2$ used, there was no negative impact on the workability of the mixes. On the whole workability of all the mixtures prepared was good.

EXAMPLES 3

Comparative Strength

The compressive strength of concrete was measured after 3, 7, 14, 28, 56, 90 and 180 days of curing on 50 mm cube specimens in accordance with ASTM C109 using a digital compression machine [ASTM C109-10, Standard Test Method for Compressive Strength of Hydraulic Cement Mortars (Using 2-in. or [50-mm] Cube Specimens), *ASTM International*, West Conshohocken, Pa., 2010]. The specimens were retrieved from the oven after each curing period and allowed to cool down prior to testing. Triplicate specimens for each curing period were prepared and tested under compression. The average value of three readings is reported.

Figure 2A:
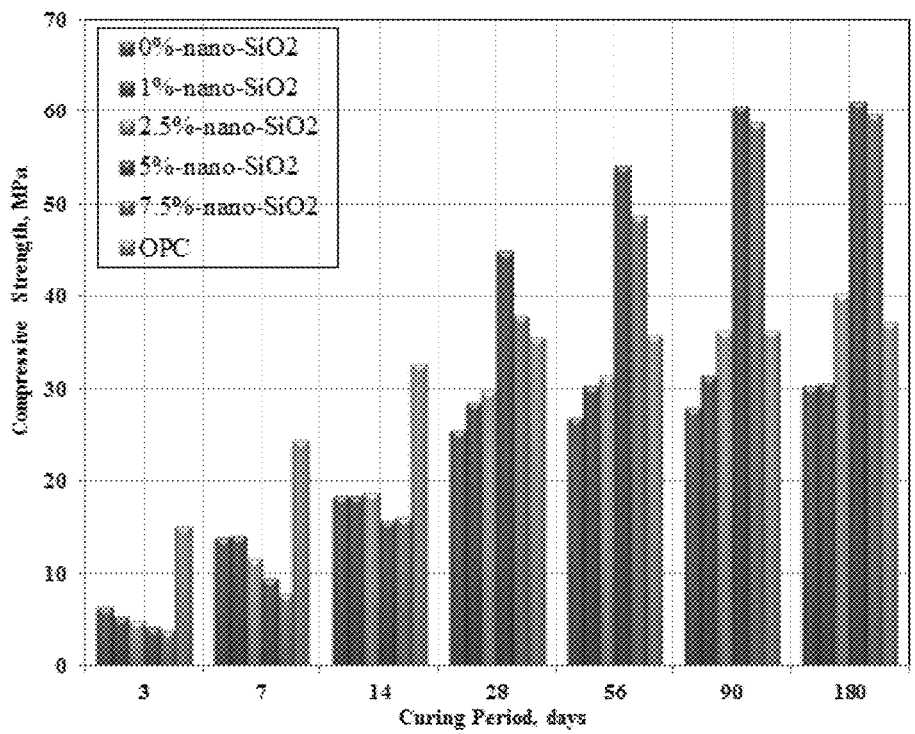
FIG. 2A illustrates the compressive strength development in AAC prepared with and without nano-$SiO_2$ and ordinary Portland cement concrete.

The compressive strength development in the AAC prepared with nano-$SiO_2$ content varying from 0 to 7.5% by weight, as well as that of OPC concrete is shown in FIG. 2A. The compressive strength was low at the onset of curing in the concrete specimens prepared with nano-$SiO_2$ compared to those prepared without it, particularly after three days of curing. However, the strength gain was remarkably high in the concrete mixes containing nano-$SiO_2$ than in the control specimens as the period of room curing continued. For instance, the compressive strength after seven days of curing in the AAC mixes containing 0%, 1%, 2.5%, 5% and 7.5% nano-$SiO_2$ was 13.87, 14.20, 11.57, 9.44, and 7.76 MPa, respectively, that was increased to 25.55, 28.45, 29.84, 44.97 and 37.92 MPa, respectively, after 28 days of curing. During the initial stages of curing, the mixtures having higher nano-SiO2 content, in particular, had concrete with lower strength during initial stages of curing, which is attributed to the reduction in pH of the mixture due to the addition of colloidal nano-SiO2. It is noteworthy that even after 28 days of curing; there was a steady increase in the compressive strength of concrete particularly in the mixes containing higher nano-$SiO_2$ content. After 90 days of curing, the compressive strength of concrete mix without nano-$SiO_2$ was 27.93 MPa, whereas those containing 1%, 2.5%, 5% and 7.5% nano-$SiO_2$ in AAC were 31.40, 36.32, 60.65 and 58.78 MPa, respectively. Accordingly, there was about 117% and 110% increase in the strength in the concrete containing 5% and 7.5% NS, respectively, compared to the control samples (0% nano-$SiO_2$), after 90 days of room curing. The increase in the compressive strength from 90 days to 180 days of continued curing was marginal in all the concrete mixes. On the contrary and as expected, the compressive strength of OPC concrete cured under wet burlap, at as early as three days was more comparable to that of AAC prepared with or without NS. However, there was a significant increase in the strength, particularly in the AAC specimens having 5% or more NS, compared to that of OPC concrete at later stages of curing. The compressive strength of AAC having 5% NS was 27% more than that of OPC after 28 days of curing.

Figure 2B:
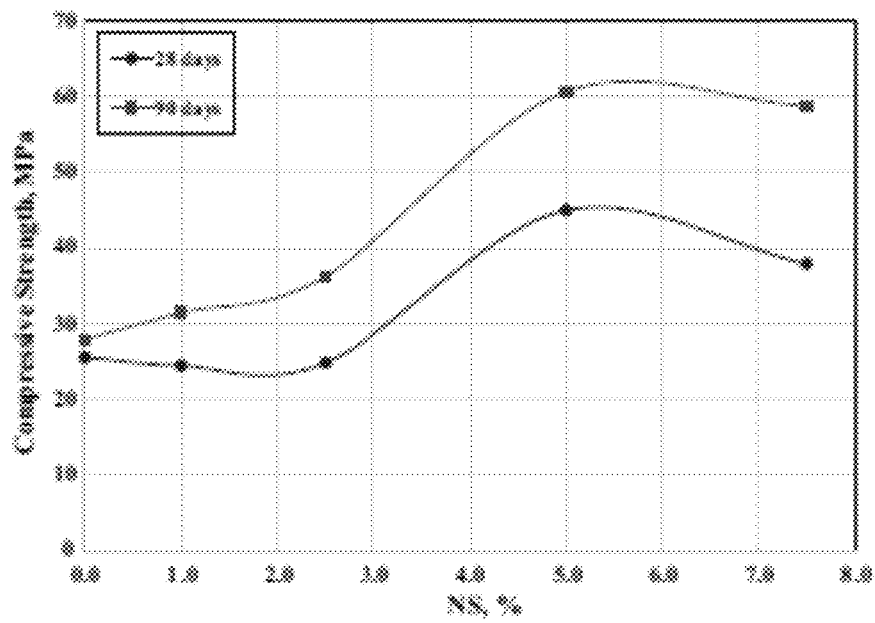
FIG. 2B shows the effect of the amount of nanosilica on the compressive strength of AAC.

Unlike the two-fold reaction, namely dissolution and precipitation that takes place in OPC, the physico-chemical reaction mechanism in the AAB is complex and extended. In these binders, the reaction mechanism progresses in three major steps. In the first step, the aluminosilicate solids are dissolved in the highly alkaline activators to form a solution. The concentration of this solution increases with time as the dissolution continues adding to the silicates already present in the alkaline activator to form a gel as oligomers resulting in the formation of long chains. This second stage in the process is called gelation. Eventually, poly-condensation takes place in which aluminosilicate species in the gel continue to rearrange and reorganize forming larger network, which results in the formation of three-dimensional aluminosilicate chains [Duxon et al. "Geopolymer technology: the current state of the art" J. Mater. Sci. 42 (9) (2007) 2917-2933; Davidovits, J. "Geopolymers—inorganic polymeric new materials, J. Therm. Anal. 37 (8) (1991) 1633-1656; Buchwald et al. "Stabilised foam clay material with high performance thermal insulation properties" CFI Ceram. Forum Int. 81 (8) (2004) E39-E42, and Duxon et al. "Understanding the relationship between geopolymer composition, microstructure and mechanical properties" Colloid Surf. A: Physicochem. Eng. Asp. 269 (1-3) (2005) 47-58]. When AAB concrete samples are cured at elevated temperature, the gel formation starts spontaneously which imparts strength to the binder structure. However, curing at elevated temperature may prematurely trigger solidification of gel and avoiding some of the steps required to complete polymerization process, without giving sufficient time to allow the alkaline liquid to completely dissolve the reactive aluminosilicate species from the precursor materials. That phenomenon explains the significant improvement in the mechanical strength of AAC by incorporating NS. Thus, a substantial enhancement in the strength of AAC could be attributed to the fact that all aluminosilicate species of the precursor material participated in the gel formation and subsequently in the poly-condensation to form increasingly larger three-dimensional network to form AAB as the room curing progressed, in particular, due to availability of reactive silica. Also, the remarkable improvement in the performance of AAC containing NS, in terms of compressive strength, as shown in the FIG. 2A, particularly with 5% NS, could be attributed to the enhanced transformation of source materials to the polymeric gel in the presence of highly reactive NS as well as due to possible particle packing effect of nanoparticles in the binder structure [Yip et al. "Coexistence of geopolymeric gel and calcium silicate hydrate at the early stage of alkali activation" Cem. Concr. Res. 35 (2005) 1688-1697; and Yip et al. "Microanalysis of calcium silicate hydrate gel formed within a geopolymeric binder" J. Mater Sci. 38 (2003) 3851-3860]. FIG. 2B shows a plot of the compressive strength vs the percentage of nanosilica particles relative to the total amount of the pozzolan in AAC. In the process of transformation, the C-S-H or C-A-S-H along with N-A-S-H gels could have been formed in the binder, which was also confirmed in the morphological and mineralogical evaluations of the binder that are presented in the examples below. Therefore, the substantial enhancement in the strength of AAC from the initial stages of curing to 90 days is the feature of ambient temperature curing of AAB synthesized by incorporating highly reactive minerals [Phoo-Ngernkham et al. "The effect of adding nano-$SiO_2$ and nano-$Al_2O_3$ on properties of high calcium fly ash geopolymer cured at ambient temperature" Mater. Des. 55 (2014) 58-65]. In conclusion, the obtained compressive strength results indicate that the developed AAC can be scaled up to industrial scale particularly for cast in situ applications.

EXAMPLES 4

Flexural Strength

Prismatic specimens measuring 50×50×200 mm were prepared to determine the flexural strength of concrete using third point loading in accordance with ASTM C78 [ASTM C1437-10, Standard Specification for Coal Fly Ash and Raw or Calcined Natural Pozzolan for Use in Concrete, *ASTM International,* West Conshohocken, Pa., 2010; ASTM C78-10, Standard Test Method for Flexural Strength of Concrete (Using Simple Beam with Third-Point Loading), ASTM International, West Conshohocken, Pa., 2010]. The flexural strength of concrete was determined at 28 and 90 days of curing. Triplicate specimens of each mix for a particular curing period were prepared and tested. The average value of three readings is reported.

Figure 3A:
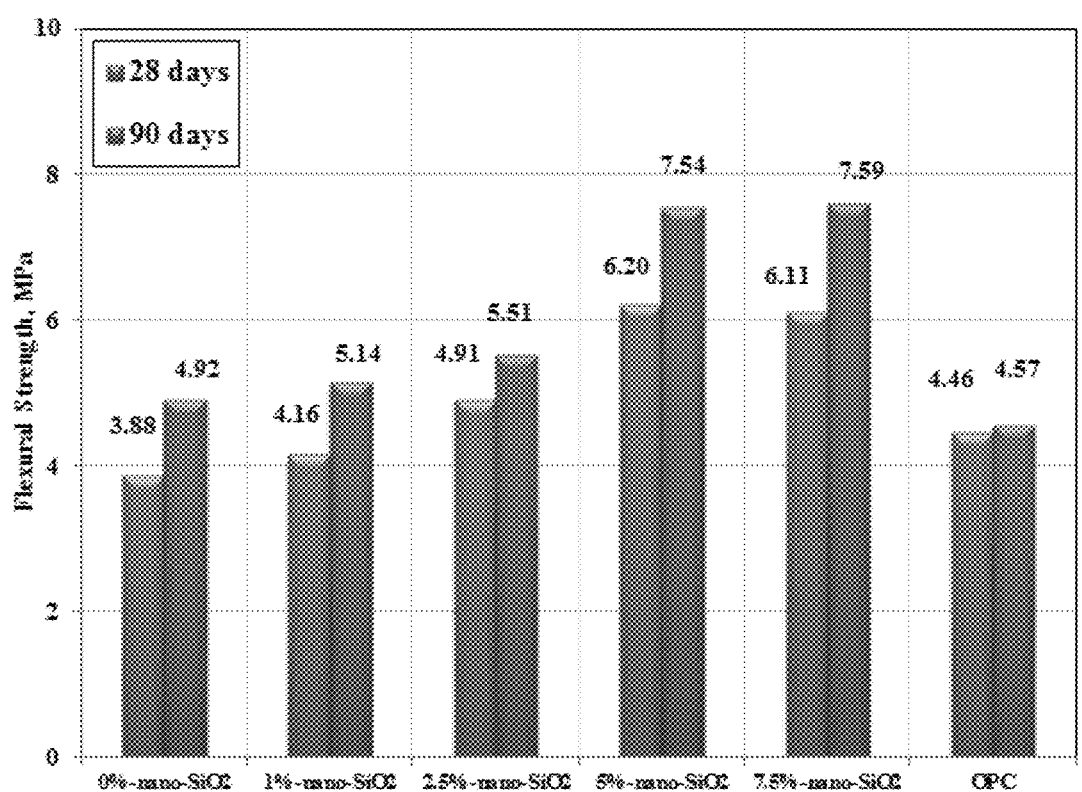
FIG. 3A shows the effect of the amount of nanos-$SiO_2$ on the flexural strength of concrete.

FIG. 3A shows the flexural strength of AAC mixtures prepared with and without nano-$SiO_2$ as well as OPC-based concrete. The flexural strength of AAC mixtures varied from 3.88 to 6.20 MPa and 4.92 to 7.59 MPa, after 28 and 90 days of curing, respectively. The flexural strength of AAC increased with increasing the amount of nano-$SiO_2$ from 0 to 7.5%. The flexural strength of mixtures without nano-$SiO_2$ was less than that of mixture incorporating nano-$SiO_2$. The maximum value was observed in the AAC with 7.5% nano-$SiO_2$. After 90 days of curing, there was about 4.47%, 11.99%, 53.25% and 54.27% increase in the flexural strength in the AAC mixtures incorporating 1%, 2.5%, 5% and 7.5% nano-$SiO_2$, respectively, over control mixture prepared without nano-$SiO_2$. Further, the flexural strength of AAC incorporating 5% and 7.5% nano-SiO2 after 28 and 90 days of curing was more or less similar. These findings were consistent with that of compressive strength results, which exhibited a similar trend. These findings were consistent with that of compressive strength results, which exhibited a similar trend. Largely, the flexural strength data reported herein are consistent with previous reports, wherein, partial replacement of binders with nanoparticles resulted in an improvement in the mechanical properties [Phoo-Ngernkham et al. "The effect of adding nano-$SiO_2$ and nano-$Al_2O_3$ on properties of high calcium fly ash geopolymer cured at ambient temperature" Mater. Des. 55 (2014) 58-65; and Adak et al. "Effect of nano silica on strength and durability of fly ash based geopolymer mortar" Constr. Build. Mater. 70 (2014) 453-459]. The increase in the flexural strength of AAC as NS was increased from 0% to 7.5% could be attributed to the greater dissolution of Si and Al, which consequently intensified the rate of polymerization process (Phoo-Ngernkham et al. and Adak et al.) Such phenomenon subsequently improved the microstructure of the binder by filling pores, as discussed at length in the subsequent sections.

The flexural strength of OPC concrete after 28 and 90 days of water curing was 4.46 MPa and 4.57 MPa, respectively (FIG. 3A). The values are low compared to the flexural strength of AAC, except for the mix that was prepared without nano-SiO2 and cured for 28 days. About 65% improvement in the flexural strength was noted, particularly in the AAC mixes prepared with 5% and 7.5% nano-SiO2, compared to that of OPC cured for 90 days. In general, the flexural strength of AAC cured at both the curing regimes, elevated [Hardjito et al. "On the development of fly ash-based geopolymer concrete" ACI Mater. J. 101 (6) (2004) 467-472; and Hardjito, D. "Studies of fly ash-based geopolymer concrete" Doctoral dissertation, Curtin University, Perth, Australia, 2005] as well as ambient [Deb et al. "The effects of ground granulated blast-furnace slag blending with fly ash and activator content on the workability and strength properties of geopolymer concrete cured at ambient temperature, Mater. Des. 62 (2014) 32-39] was reported to be more than that of OPC concrete. Also, reported by several other studies, the flexural strength of AAB is generally more than that of OPC due to compact and stronger interfacial transition zone within the binder structure [Sofi et al. "Engineering properties of inorganic polymer concretes (IPCs)", Cem. Concr. Res 37 (2007) 251-257; Ryu et al. "The mechanical properties of fly ash-based geopolymer concrete with alkaline activators" Constr. Build. Mater. 47 (2013) 409-418; and JWongpa et al. "Compressive strength, modulus of elasticity, and water permeability of inorganic polymer concrete" Mater. Des. 31 (2010) 4748-4754]

The flexural strength of concrete is a key engineering property related to compressive strength, which shows the ability of a structural member to resist failure in bending. In case of OPC concrete, various codes and standards have proposed relationships to predict the flexural strength of concrete utilizing available compressive strength. The relationships are well established due to availability of extensive data of different engineering properties of such a concrete, developed over the period of several decades. However, as the binder formed during the alkali activation of aluminosilicate precursor materials is different from that of OPC hydration in which C-S-H gel is usually formed, the behavior of such a concrete might be different from that of OPC. Therefore, the compressive and flexural strength after 28 and 90 days of curing were utilized to develop a correlation between them by plotting square root of compressive strength on abscissa and flexural strength as ordinate, as shown in 3B. The correlation between flexural and compressive strength can be expressed by Eq. (1) obtained by regression analysis of the obtained data.

$$ft = 1.246\sqrt{(fc')} - 2.060 \tag{1}$$

Figure 3B:
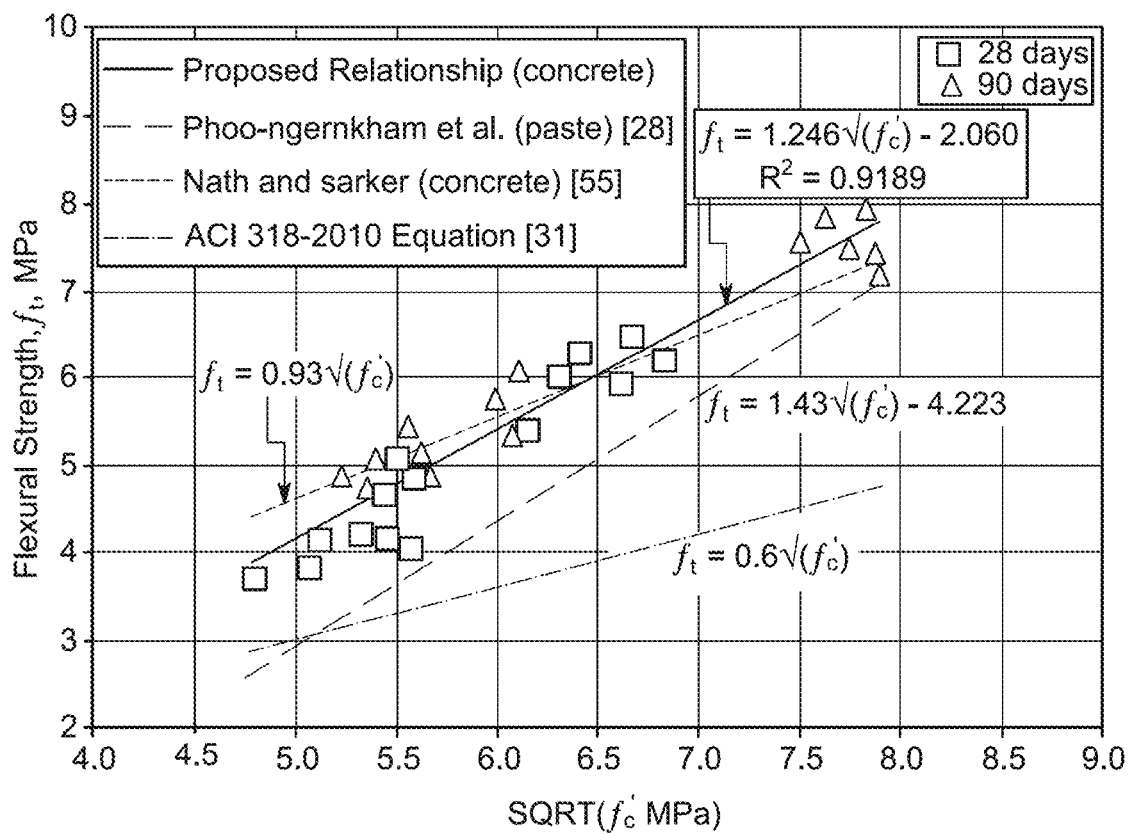
FIG. 3B shows the correlation between flexural strength and compressive strength of AAC and its comparison with other constitutive models.

In order to compare the relationship developed in this study with other statistical models, the flexural strength was also computed using relationships proposed by Phoo-ngernkham et al. and Nath and Sarker ["Flexural strength and elastic modulus of ambient-cured blended low-calcium fly ash geopolymer concrete" Constr. Build. Mater. 130 (2017) 22-31.], that are given in Eqs. 2 and 3, respectively, (see FIG. 3B). The flexural strength was also calculated using Eq. 4 as specified in ACI 318-10 [Building Code Requirement for Structure Concrete Practice and Commentary, American Concrete Institute, 2010] and plotted in FIG. 3B.

$$ft = 1.430\sqrt{(fc')} - 4.223 \tag{2}$$

$$ft = 0.93\sqrt{(fc')} \tag{3}$$

$$ft = 0.6\sqrt{\sqrt{(fc')}} \tag{4}$$

where ft is the flexural strength and $\sqrt{(fc')}$ is the compressive strength, both in MPa.

The flexural strength of AAC after 28 and 90 days of room temperature curing computed, as a function of compressive strength was greater than that estimated using ACI 318-10 equation, particularly correct for those AAC mixes containing higher NS content. As the compressive strength increased so did the difference in the predicted values. This means that for higher compressive strength, the relationship given in ACI 318-10 predicts much lower flexural strength of AAC for this study as well as other similar studies by Nath and Sarker. The flexural strength predicted using the model developed by Phoo-ngernkham et al. was also less than that reported herein which could be attributed to the absence, of coarse and fine aggregates in the mixtures. However, the flexural strength calculated using the statistical model proposed by Nath and Sarker gives values of similar order. For example, at 28 days of curing, for about 40 MPa strength concrete the flexural strength from the Nath and Sarker model was 5.88 MPa, which is about 1% less than the experimental value obtained in this study, while, it was more than 35% above the value estimated using ACI 318-10 equation. Based on these results, it can be concluded that ACI 318-10 equation did not accurately predict the flexural strength of AAC. Further, considering the large number of mix design variables and limited availability of engineering properties of AAC, the proposed herein statistical model as well as those previously reported cannot be used as a general correlation between the compressive strength and other engineering parameters of AAC.

EXAMPLES 5

Modulus of Elasticity:

The modulus of elasticity of concrete was measured on 75 mm diameter and 150 mm high cylindrical concrete specimens. The experiment was conducted in accordance with ASTM C 469 [ASTM C496-10, Standard Test Method for Splitting Tensile Strength of Cylindrical Concrete Specimens, ASTM International, West Conshohocken, Pa., 2010]. The modulus of elasticity was measured after 28 and 90 days of curing. Three specimens were tested for each period and average value is reported. Two strain gauges, each on the opposite side of specimen, were fixed with the help of glue after capping the specimen. The compressive load was applied at the ends of specimen via a load cell until failure. During the load-controlled test, the applied load (kN) and corresponding compressive strain (∈) measured by strain gauges were recorded utilizing a data logging system. The load and strain data were used to plot stress-strain curves from which static chord modulus was calculated using the following Eq. (5) given in ASTM C469.

$$Ec = (S2-S1)/(\in 2 - 0.0000050) \quad (5)$$

where:
$Ec$=Chord modulus of elasticity, MPa,
$S2$=Stress corresponding to 40% of ultimate load,
$S1$=Stress corresponding to a longitudinal strain, $\in 1$, of $50 \times 10^{-6}$ MPa, and
$\in 2$=Longitudinal strain produced by stress $S2$.

Figure 4A:
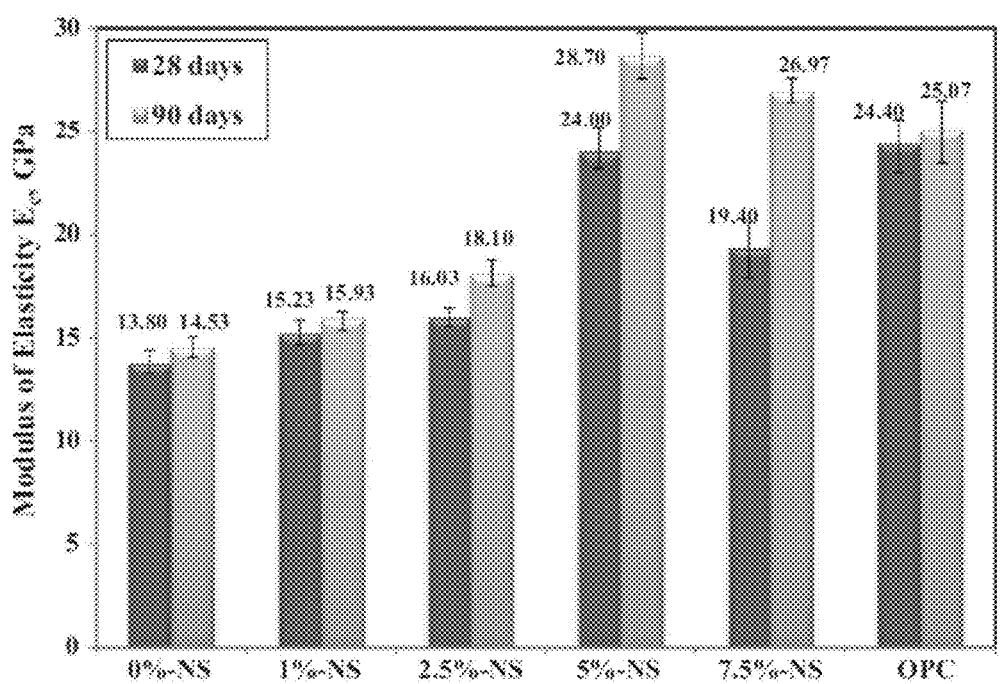
FIG. 4A shows the effect of nano-SiO$_2$ on the modulus of elasticity of AAC and the modulus elasticity of OPC.

FIG. 4A shows the mean values of modulus of elasticity of AAC mixes with and without NS. Also, it shows the modulus of elasticity of OPC-based concrete. The modulus of elasticity increased with increasing curing, period and the quantity of NS in the AAC. It is in the range of 13.80-24.00 GPa and 14.53-28.70 GPa, after 28 and 90 days of curing, respectively. The modulus of elasticity of AAC followed a trend similar to that of compressive and flexural strength. AAC prepared with 5% NS resulted in the highest modulus of elasticity at both curing periods, whereas, it was the lowest in the concrete mixture prepared without NS. The increase in the modulus of elasticity of NS modified AAC mixes may be attributed to the greater transformation of amorphous and semi-crystalline phases in the precursor material to the polymeric compounds, including C-A-S-H as well as N-A-S-H (Phoo-Ngernkham et al.). The modulus of elasticity of OPC concrete after 28 and 90 days of curing was 24.40 MPa and 25.07 MPa, respectively. Notably from the data in FIG. 4A, the modulus of elasticity of AAC is less than that of OPC for similar compressive strength values. For instance, the average compressive strength of AAC incorporating 2.5% NS was 36.77 MPa after 90 days of curing, whereas the modulus of elasticity was only 18.10 GPa. On the contrary, the modulus of elasticity of OPC concrete after 90 days of curing was 25.07 MPa, while the compressive strength was 37.87 MPa. This shows that the modulus of elasticity of ACC is about 28% less than that of OPC though both had the same compressive strength. A similar trend has also been reported elsewhere Soil et al.). Further, according to the data reported by Nath and Sarker. the modulus of elasticity of AAC was about 25-30% less than that of OPC.

Figure 4B:
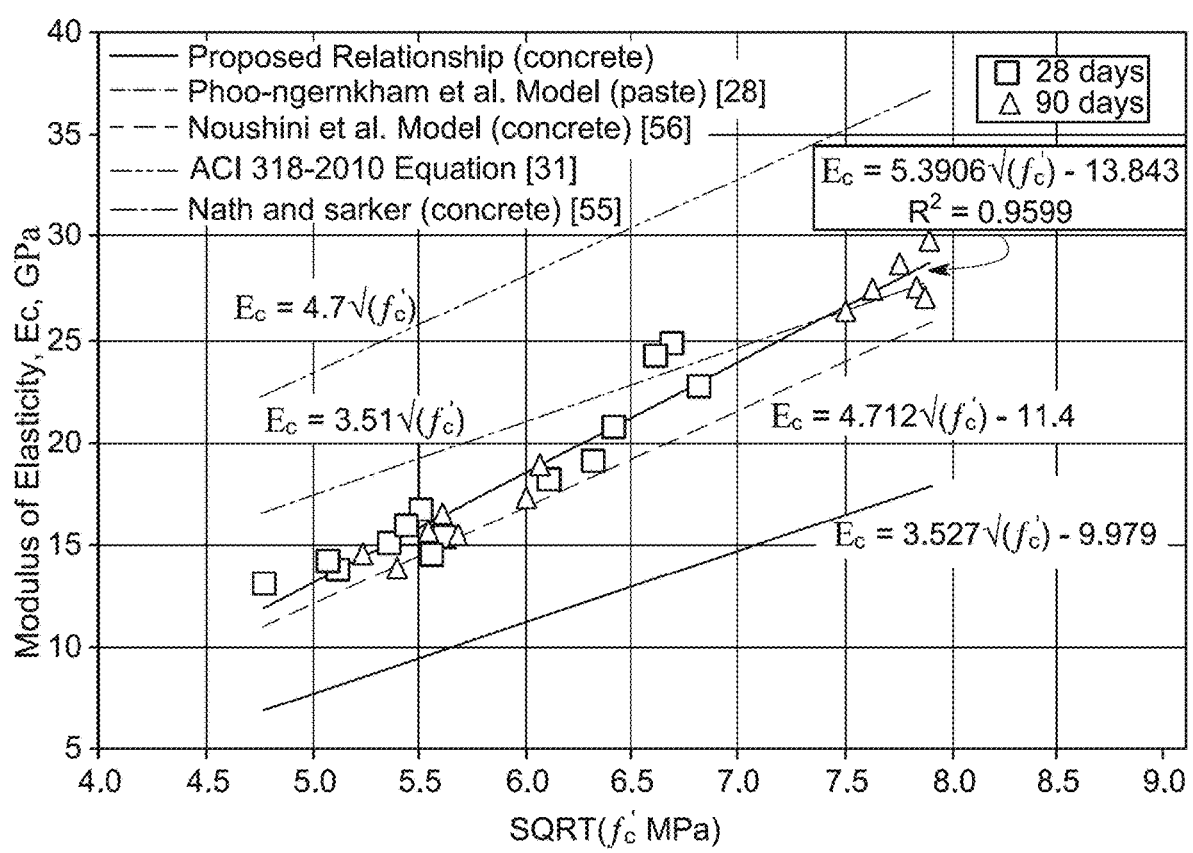
FIG. 4B shows the correlation between modulus of elasticity and compressive strength of AAC.

Also, modulus of elasticity is a critical concrete parameter that is used to calculate the serviceability requirements including deflection and cracking of building elements. Also, it is utilized in the precast concrete industry, particularly for the pre-stressed concrete elements for determining the elastic shortening of concrete. Generally, for the conventional concrete, there are well-established statistical models available in the literature as well as equations recommended by the various codes and standards for estimating the modulus of elasticity using the compressive strength. In view of lower modulus of elasticity in AAC for a given strength, the models for OPC concrete may not be suitable to compute the modulus of elasticity for AAC. The lower modulus of elasticity in AAC could be attributed to the nature of the binder formed and its stiffness that might be different from C-S-H gel formed during hydration of OPC. Therefore, an attempt was made to develop a statistical model for computation of modulus of elasticity and to compare it with the models available in the literature. FIG. 4B provides the correlation between compressive strength measured on cylindrical concrete specimens with that of modulus of elasticity of all the specimens tested in this study using regression analysis by the least squares method. The equation for predicting modulus of elasticity for OPC as per ACI 318-10 and the equations proposed by Phoo-ngernkham et al., Noushini et al. ["Compressive stress-strain model for low-calcium fly ash-based geopolymer and heat-cured Portland cement concrete" Constr. Build. Mater. 73 (2016) 136-146], Nath and Sarker for AAC are given in Eqs 6-9, respectively. The moduli of elasticity predicted by these equations utilizing compressive strength results obtained experimentally in this study are also plotted in FIG. 4B.

$$Ec = 4.7\sqrt{(fc')} \quad (6)$$

$$Ec = 3.527\sqrt{(fc')} \quad (7)$$

$$Ec = 4.712\sqrt{(fc')} \quad (8)$$

$$Ec = 3.51\sqrt{(fc')} \quad (9)$$

Based on the data disclosed herein a relationship between elastic modulus with the square root of compressive strength is proposed in Eq. 10 for AAC with NP as precursor material which was partially replaced with NS. This relationship was obtained by regression analysis of the experimentally obtained data as shown in FIG. 4B.

$$Ec = 5.390\sqrt{(fc')} - 13.843 \quad (10)$$

where Ec is the modulus of elasticity in GPa and fc' is the compressive strength in MPa.

FIG. 4B shows that there is a linear relationship between the modulus of elasticity of AAC developed in this study with, the square root of compressive strength measured. It is evident from the figure that the modulus of elasticity calculated using ACI 318-10 is significantly more than that predicted by other models as well as proposed model disclosed herein. With regard to the model presented by Phoo-ngernkham et al., it under estimates the modulus of elasticity of AAC compared to the value obtained in this study. This might be attributed to the fact that Phoo-ngernkham et al. used alkali-activated paste for the determination of engineering properties. However, statistical models proposed by Noushini et al. and Nath and Sarker match very well with the experimental results of this investigation. For example, at 28 days of curing, for about 40 MPa strength concrete, modulus of elasticity from the Noushini et. al., and Nath and Sarker are 18.40 GPa and 22.20 GPa, which are about ±15% of the values obtained in this study. The marginal variation could possibly be due to the differences in mixture design parameters, including type of binder. Further, it is more than 50% less compared to ACI 318-10 predicted value. Based on the results presented herein, it can be summarized that the equation given in ACI 318-10 overestimates the modulus of elasticity and it is not suitable for predicting the values for AAC. It is also important here to emphasize that the statistical models presented herein and that of others cannot be used as general correlations. In order to establish a general correlation between different properties of AAC, sufficient data need to be obtained by undertaking further research with all possible mix design variables for AAC.

EXAMPLES 6

Water Absorption and Volume Permeable Voids

Water absorption and apparent volume of permeable voids (VPV) of hardened concrete was conducted according to ASTM C642 [ASTM C642-10, Standard Test Method for Density, Absorption, and Voids in Hardened Concrete, ASTM International, West Conshohocken Pa., 2010]. The water absorption and volume of permeable voids were measured using 75 mm diameter and 150 mm long concrete specimens. The specimens were first oven dried for more than 24 hours in the oven maintained at 105° C. until constant weight is achieved and the dry weight was recorded as 'A'. Subsequently, specimens were immersed in the water for more than 48 hours until the constant weight is attained and the resulting saturated weight was recorded as 'B'. Water absorption is then calculated using the following equation:

$$\text{Water Absorption \%} = \frac{B - A}{A} \times 10 \quad (2)$$

For determining volume of permeable voids, saturated mass of the sample after 5 h boiling was measured and designated as 'C', subsequently, apparent weight of the same was determined by suspending the sample in water illustrated as 'D'. Volume of permeable voids is calculated using following expression:

$$\text{Volume of Permeable Voids, } VPV\ \% = \frac{(C - A)}{(C - D)} \times 100 \quad (3)$$

Figure 5A:
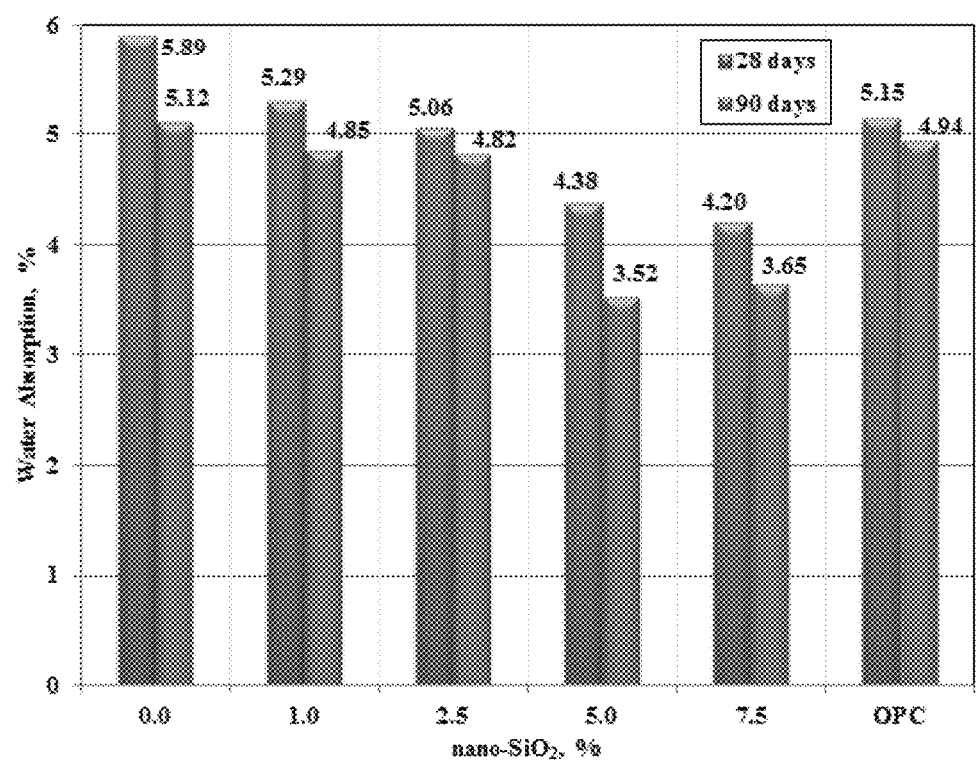
FIG. 5A shows the effect of the amount of nano-SiO$_2$ on the water absorption by AAC.

Where:
A: Dry weight of the specimens,
B: Saturated weight of the sample,
C: Saturated boiled weight of the specimen, and
D: Immersed apparent weight of the sample Water absorption and volume of permeable voids are durability characteristics of the hardened concrete. Water absorption in the range of 3% to 6% are generally categorized as good concrete suitable for structural applications. Water absorption of hardened AAC prepared by combination of natural pozzolan and nano-$SiO_2$ cured at room temperature for 28 and 90 days is given in FIG. 5A. It decreased as the nano-$SiO_2$ content increased in the AAC mixtures. Water absorption was in the range of 4.20% to 5.89% in the concrete prepared in this disclosure after 28 days of curing, while, it was between 3.52% and 5.15% in the concrete specimens cured for 90 days. Water absorption reduced as the curing extended from 28 days to 90 days. The maximum value of 5.12% was recorded in the AAC mixture prepared without nano-$SiO_2$, while, it was about 4.85%, 4.82%, 3.52% and 3.45%, respectively, in the concrete mixes containing 1%, 2.5%, 5% and 7.5% nano-$SiO_2$ after 90 days of room temperature curing.

Figure 5B:
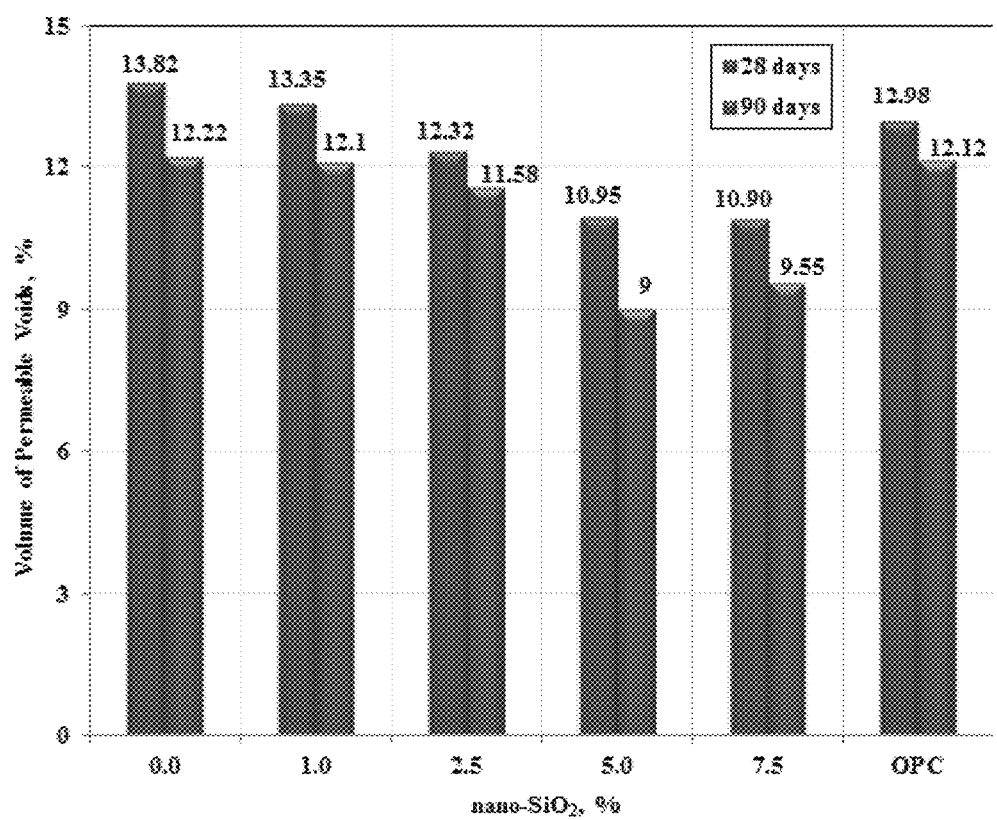
FIG. 5B shows the effect of the amount of nano-SiO$_2$ on the volume of permeable voids of the AAC.
Figure 14A:
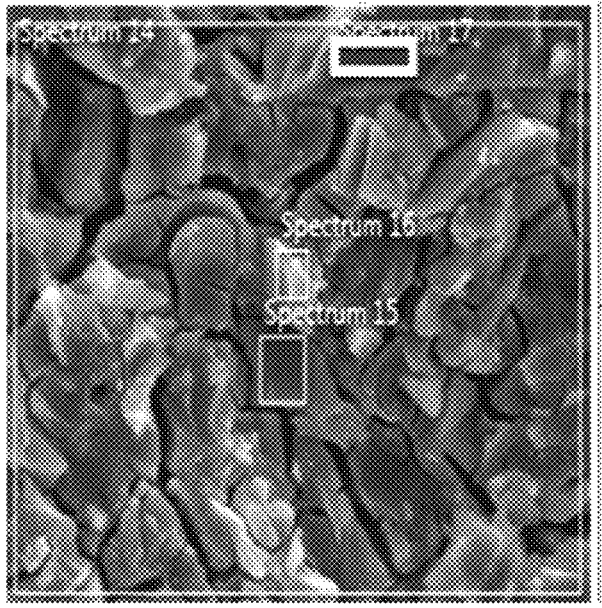
FIG. 14A show a SEM micrograph, rectangular marks distinct features selected for elemental compositions by of NP-based AAP modified with 5% NS.
Figure 14B:
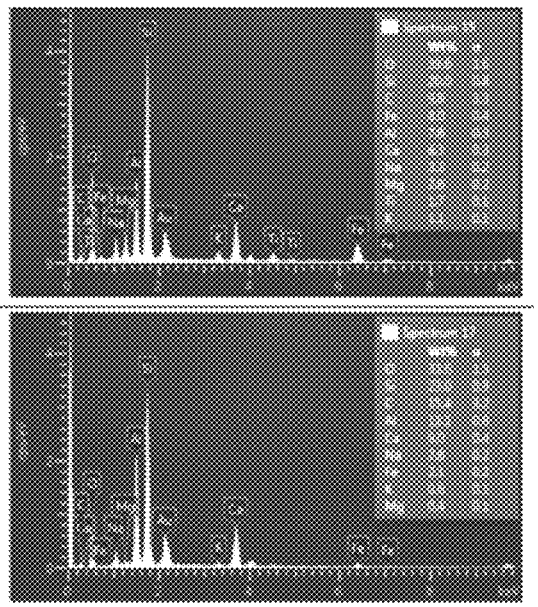
FIG. 14B show EDS of NP-based AAP obtained from the selected area of the micrograph of FIG. 14A.
Figure 15A:
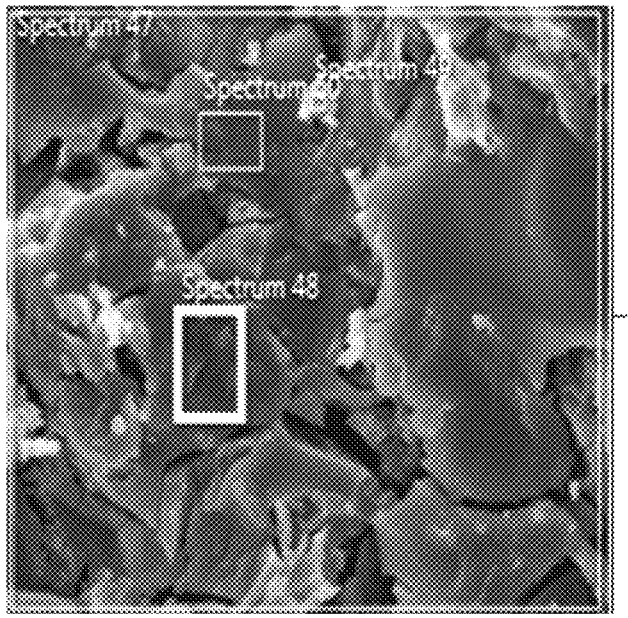
FIG. 15A shows a SEM micrograph, rectangular marks distinct features selected for elemental compositions by of NP-based AAP modified with 7.5% NS.
Figure 15B:
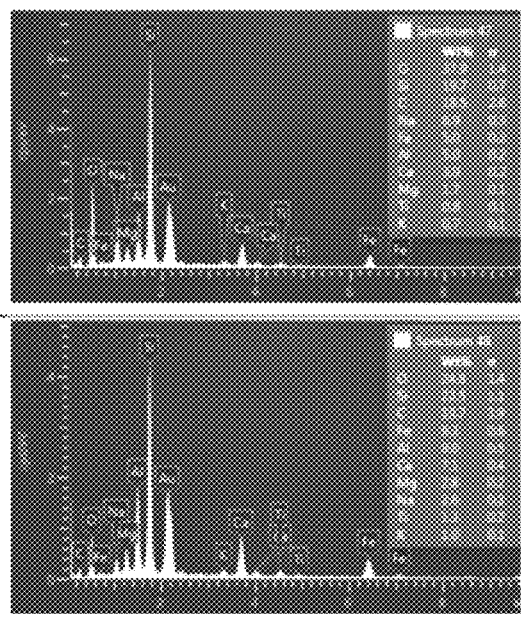
FIG. 15B shows EDS of NP-based AAP obtained from the selected area of the micrograph of FIG. 15A.

The results of volume of permeable voids are shown in the FIG. 5B which appear to be following similar trend as water absorption. The volume of permeable voids was lower in the mixtures containing higher nano-$SiO_2$ content as compared to the ones prepared with those containing lower levels. The water absorption and volume of permeable voids in the OPC based concrete was more or less similar to the results obtained for the AAC prepared without nano-$SiO_2$ as well as with the ones prepared with 1% and 2.5%. However, the percentage water absorption and volume of permeable voids of AAC prepared with 5% and 7.5% nano-$SiO_2$ was considerably lower than that of OPC-based concrete as well as AAC mixture having prepared without nano-$SiO_2$.

EXAMPLE 7

Scanning Electron Microscope (SEM) and Energy Dispersive Spectroscope (EDS)

The middle portions of 25 mm cubes of alkaline activated past (AAP) extracted and examined by SEM. Suitable sizes of test specimens were prepared and fixed on a brass stub specimen holder with the help of a sticky tape. The specimens were dried under infrared light and subsequently a layer of gold coating was applied utilizing a blazer sputtering coater. A JEOL model 5800 LV SEM was used to examine the specimens. The SEM was equipped with an EDS which was utilized to examine the elemental composition of the specimens. Microstructure of each specimen was carefully examined and micrographs were recorded at 20 kV using secondary mode. In each micrograph, 3-4 spots having distinct features were selected and elemental compositions at the spots were obtained.

SEM images of NP-based AAP prepared with 0%, 1%, 2.5%, 5% and 7.5% NS in two different magnifications are shown in 6-10. Well-defined cracks and voids are seen in the microstructure of AAP without NS due to insufficient gel formation, which most probably lead to the partial filling of pores. The rims in the micrograph appeared to be disconnected due to terminated chemical reaction between the binder particles and alkaline solution. That explains the lower mechanical strength of AAC synthesized without NS. On the contrary, as the quantity of NS increased in the mixtures from 1% to 7.5%, homogeneity of the binder matrix started to increase with fewer cracks and voids. That occurred because of the fact that the fine particles induced higher leaching of silica and alumina to form polymeric compounds, as evident from the results of EDS analysis described below. The formation of polymer compounds resulted in a compact and uniform microstructure that enhanced the strength of the matrix. The specimens with 5% NS appeared to be well formed, homogenous and denser in nature compared to the specimens with other replacement levels. There appears to be a greater conversion of source material to polymeric compounds, in the specimen with 5% NS because of the fact that the Ca/Si and Al/Si ratios were higher as observed in the EDS analysis. As discussed in the previous section, there was about 117% and 98% improvement in compressive and flexural strength, respectively, in the specimens with 5% NS compared to the mix without NS. Also, the microstructure was dense and compact in the mix with 7.5% NS; However, the unreacted nanoparticles together with particles of primary precursor material could be seen in the matrix, which did not help in further enhancing the microstructure and subsequently the strength development.

It can be observed by examining the micrographs of various mixtures that insufficient binder was formed in the specimens pre-pared with 0-2.5% NS, whereas addition of 7.5% NS resulted in agglomeration of nanoparticles. These results are consistent with earlier reported results in which it was concluded that 6% replacement of fly ash with NS resulted in better mechanical and microstructural characteristics [Phoo-Ngernkham et al. "The effect of adding nano-SiO2 and nano-Al2O3 on properties of high calcium fly ash geopolymer cured at ambient temperature" Mater. Des. 55 (2014) 58-65]. The superior performance of binders containing NS attributed to the additional formation of aluminosilicate hydrates, such as C-A-S-H and N-A-S-H resulting in the well-formed microstructure that increases the mechanical strength of AAC which was also reported in earlier research [Wang et al. "Effect of fineness and particle size distribution" Adv. Cem. Res. 17 (2005) 160-166]. The greater conversion of alumina and silica in to polymeric compounds was also confirmed through the EDS analysis. The results reported herein are in good agreement with the outcomes of other reported results, wherein addition of NS as partial replacement of high calcium fly ash resulted in the additional formation of C-S-H or C-A-S-H compounds that co-existed with N-A-S-H polymeric gel [Phoo-Ngernkham et al.]. Hence, significant improvement in the microstructural properties of the developed mixes, particularly with 5% NS, is the characteristics of room curing in which all the aluminosilicate species present in the binder are consumed during the polymerization process before the supersaturated highly alkaline solution solidifies to form long chained polymeric gel contrary to the thermal curing.

Elemental Compositions

The quantity of elements, such as O, Si, Na, Fe, Al and Ca in terms of atomic percentage within the binder structure determined through EDS for AAP prepared by replacing 0%, 1%, 2.5%, 5% and 7.5% NP with NS is shown in FIGS. 11-15, respectively. A comparison of elemental composition at selected spots in the matrix of the specimens is given in Table 8. The in constituents of reaction product in all the AAP include Si, Na, Al and Ca in varying quantities and ratios. These are the backbone of AAB framework, and they provide strength to the matrix. Other minor constituents, which often do not participate in the polymerization process, were also found in the structure, such as Mg, Ti and K. The most similar spots in the alkali-activated matrix were selected carefully in each mix to determine elemental composition through EDS as they were intended to be compared. The quantity of Si in the AAP modified by adding NS was high compared to the mix without it. The Si content was as high as 20% and 23% (Spectrum 15 and 17) in the AAB with 5% NS is indicative of the fact that the Si—O—Si bonding was dominant in influencing the properties of AAB.

TABLE 8

Elemental composition of AAP produced with and without NS

| Element | Spectrum for 0% NS | | Spectrum for 1.0% NS | | Spectrum for 2.5% NS | | Spectrum for 5% NS | | Spectrum for 7.5% NS | |
| --- | --- | --- | --- | --- | --- | --- | --- | --- | --- | --- |
| | 1 | 3 | 21 | 22 | 46 | 47 | 15 | 17 | 47 | 48 |
| O | 47.2 | 48.1 | 40.9 | 39.2 | 37.3 | 32.3 | 39.6 | 33.6 | 37.9 | 24.8 |
| Si | 15.1 | 16.1 | 18.8 | 19.8 | 19.4 | 20.0 | 20.0 | 23.0 | 19.7 | 22.5 |
| Na | 7.7 | 9.4 | 7.3 | 8.1 | 6.0 | 4.2 | 3.3 | 2.8 | 6.9 | 2.6 |
| Fe | 4.3 | 3.6 | 6.1 | 6.3 | 7.7 | 7.4 | 8.0 | 2.1 | 5.0 | 9.3 |
| Al | 4.4 | 4.2 | 5.1 | 5.1 | 5.9 | 7.1 | 7.6 | 13.1 | 5.0 | 9.0 |
| Ca | 4.1 | 3.3 | 4.2 | 4.5 | 5.1 | 6.1 | 6.3 | 9.0 | 3.9 | 7.1 |
| Mg | 1.7 | 1.7 | 2.8 | 2.0 | 2.9 | 2.2 | 2.6 | 0.4 | 1.7 | 2.8 |
| Ti | 0.9 | 0.7 | 1.0 | 1.3 | 1.2 | 1.6 | 1.7 | — | 0.8 | 1.3 |
| K | 0.7 | 0.6 | 0.7 | 0.9 | 1.0 | 1.0 | 1.1 | 0.6 | 0.7 | 1.0 |
| Al/Si | 0.29 | 0.26 | 0.27 | 0.26 | 0.30 | 0.36 | 0.38 | 0.57 | 0.25 | 0.40 |
| CalSi | 0.27 | 0.20 | 0.22 | 0.23 | 0.26 | 0.31 | 0.32 | 0.39 | 0.20 | 0.32 |
| Na/Si | 0.51 | 0.58 | 0.39 | 0.41 | 0.31 | 0.21 | 0.17 | 0.12 | 0.35 | 0.12 |

Figure 16:
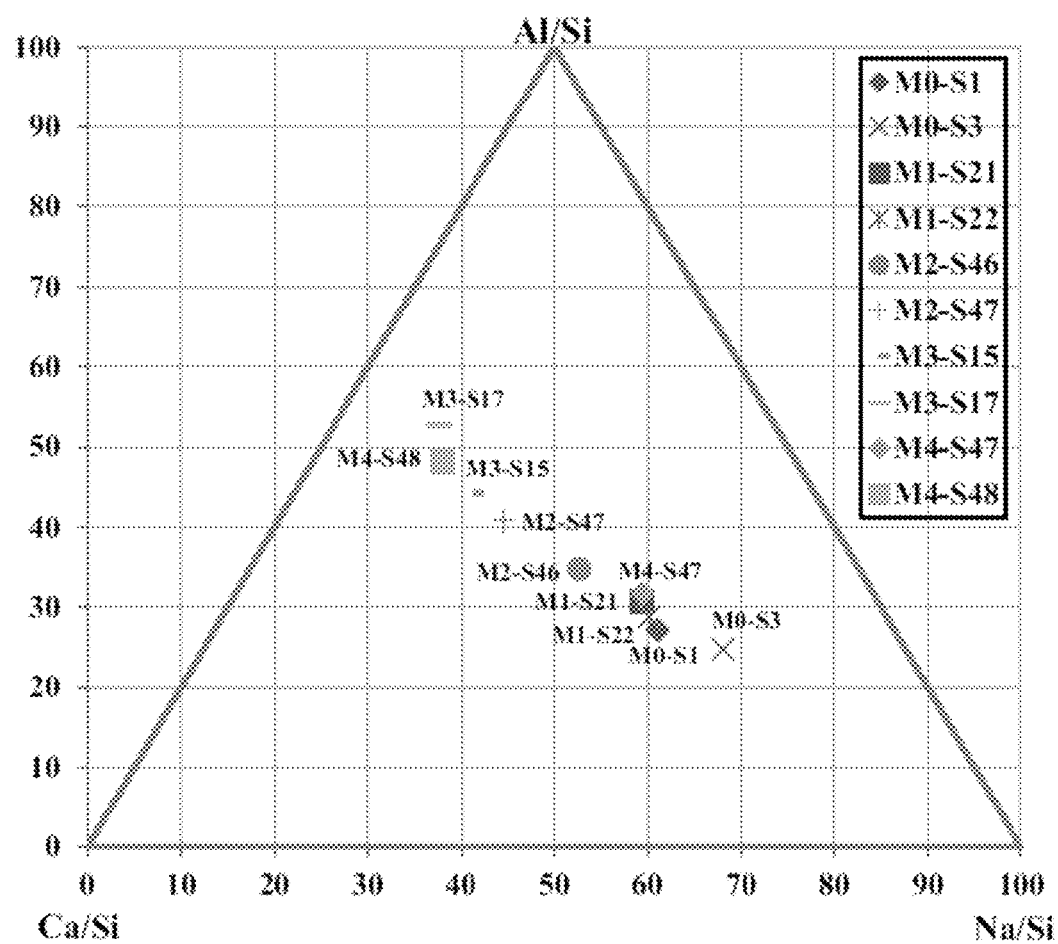
FIG. 16 shows ternary diagram of AAP synthesized with and without NS

A ternary diagram with vertices Al/Si, Ca/Si and Na/Si ratio was developed using the elemental composition, as shown in FIG. 16. The vertices were selected as they are the main reaction products and normalized with Si content in order to determine the dominant nature of the gel. It is interesting to note, in the ternary diagram, that AAP prepared with and without small quantities of NS of up to 2.5%, the composition of gel lies towards Na/Si vertex. On the other hand, the nature of the gel formed with higher replacement levels of NP with NS shifted away from the Na/Si vertex closer to the Ca and Al side. These results are suggestive of the fact that the nature of the gel formed in case of mixtures with higher NS content exhibits more Al and Ca in the structure. Based the on the ternary diagram, the nature and structure of the reaction products and consequently the alkali activation of NP in the reference mixture as well as those with NS lies very close to the circumcenter of the diagram which implies that all the components taken as vertices were part of the gel formation. However, the reaction product in the AAP without NS as well as in the mixtures with lower NS content the composition of the gel lies closer to Na/Si vertices. Further, it was predominantly composed of sodium-alumina-silicate-hydrate (N-A-S-H) along with traces of C-S-H, as Ca/Si ratio was low. On the other hand, the nature of gel formed in the mixtures containing 5% and 7.5% NS is a combination of calcium-alumina-silicate-hydrate (C-A-S-H) with Na in the framework and C-S-H to balance the charges of tetrahedral alumina [Yip et al. "Coexistence of geopolymeric gel and calcium silicate hydrate at the early stage of alkali activation" Cem. Concr. Res. 35 (2005) 1688-1697; Phoo-Ngerukham et al, "Properties of high calcium fly ash geopolymer pastes containing Portlad cement as additive" Int. J. Miner. Metall. Mater. 20 (2013) 214-220; and Provis et al. "Geopolymers and other alkali activated materials: why, how, and what?" Mater Struct. 47 (1-2) (2014) 11-25]. The results are consistent with the findings reported earlier, wherein N-A-S-H and C-A-S-H gels were shown to coexist in the binder structure [Yip et al.]. Hence, there was a remarkable enhancement in the properties of the AAB due to the higher leaching of Si and Al from the precursor material to form these compounds because of the addition of NS in the mixtures.

EXAMPLE 8

XRD

The middle portions of cubical specimens were extracted, ground and sieved to obtain fine powder, which was used to perform XRD analysis using a Bruker instrument model d2-Phaser. The analysis was done at a scan rate of 2.5°/min using Cu-Ka radiation (40 kV, 40 mA) through continuous scanning in the range of 0-80° 2-theta.

Figure 17:
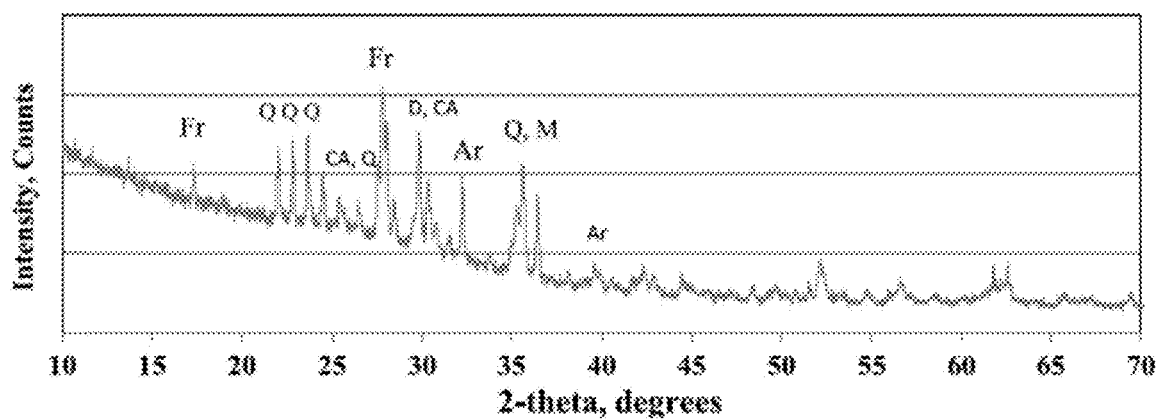
FIG. 17 shows XRD pattern of raw NP: (Fr) Forsterite, (Q) Quartz, (CA) Cristobalite alpha, (D) Diopside, (Ar) Anorthite, and (M) Maghamite FIG. 18 XRD patterns of NP-based AAP synthesized by incorporating NS cured at room temperature: (Q) Quartz, (CSH) Calcium Silicate Hydrate, (P) Philipsite, (C) Calcite, (Z) Zeolite Y, (A) Aluminosilicate, and (H) Hematite.
Figure 18:
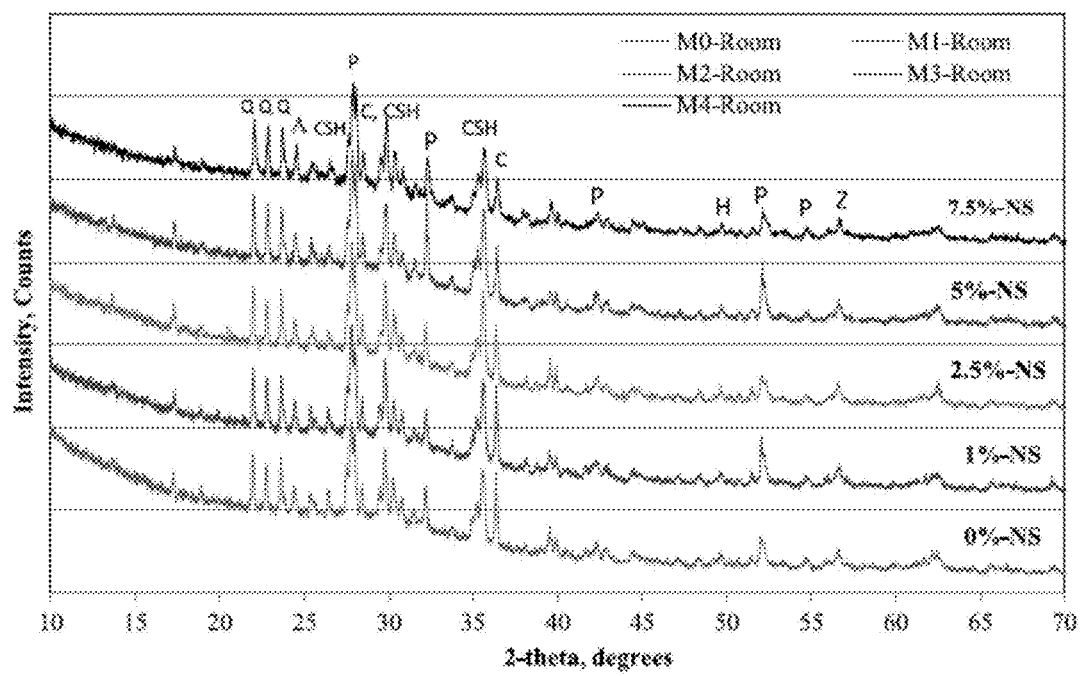

The XRD of raw NP is shown in FIG. 17. The pattern shows the main crystalline phases of quartz (Q), forsterite (Fr), cristobalite alpha (CA), diopside (D), anorthite (Ar) and maghernite (M). The peaks indicate that the raw NP is crystalline to amorphous in nature. Similar pattern was observed in a previous study of the same precursor material [Juhyuk et al. "Characterization of natural pozzolan-based geopolymeric binders" Cem. Concr, Compos. 53 (2014) 97-104]. XRD patterns of AAP containing different quantities of NS are shown in FIG. 18. These patterns illustrate two major phases, one between 10 and 20° 2Θ and the other between 20 and 40° 2Θ in which the former is identified as aluminosilicate and later as glassy phase of the polymeric gel. These two phases are believed to play a significant role on the nature and extent of polymeric composition in AAB. Any changes in these regions are reflected on the strength and microstructure of the binder. The developed patterns in the study indicate that there were no new crystalline phases detected compared to the XRD of raw material. However, the intensity of the crystalline peaks in the AAP appeared to be weaker compared to those in the raw NP. Majority of the phases present in the raw material were consumed during alkali activation indicating that it was reactive in nature. Other compounds, such as quartz, calcite, philipsite, C-S-H, aluminosilicate and traces of zeolite Y were observed in the XRD patterns that are the backbone of alkali-activated framework. However, some of the crystalline phases were also seen in the AAP after activation resulting from the unreactive nature of the raw materials, such as anorthite and forsterite.

The presence of Ca in the raw material is an important factor determining the formation of C-S-H, which enhances the strength of these binders as previously reported [Oh et al. "The evolution of strength and crystalline phases for alkali-activated ground blast furnace slag and fly ash, based geopolymers" Cem. Concr. Res. 40 (2) (2010) 189-196; Oh et al. "Monteiro, Microstructural and compositional change of NaOH-activated high calcium fly ash by incorporating Na-aluminate and co-existence of geopolymeric gel and C-S-H (I)" Cem. Concr. Res. 42 (5) (2012) 673-685: and Brough et al. "Adiabatically cured, alkali-activated cement-based waste forms containing high levels of fly ash formation of zeolites and Al-substituted CSH" Cem. Concr. Res. 31 (10) (2001) 1437-1447]. Due to the presence of sizable amount of Ca (12%) in the raw NP, there exist a minor phase around 29.4° 2Θ in the XRD patterns of AAP indicating the presence of C-S-H in the binder structure [Oh et al. "The evolution of strength and crystalline phases for alkali-activated ground blast furnace slag and fly ash based geopolymers" Cem. Concr. Res. 40 (2) (2010) 189-196; Brough et al.; and Somna et al. "NaOH activated ground fly ash geopolymer cured at ambient temperature" Fuel 90 (2011) 2118-2124.]. Also, it was reported elsewhere that the incorporation of sodium silicate in the alkaline activator accelerates the formation of C-S-H thereby enhancing the microstructure of the binder by filling voids in the structure [Juhyuk et al. Cem. Concr. Compos. 53 (2014) 97-104]. The XRD patterns of the NS modified AAP are slightly different from the one without it. The peaks in these patterns were reduced and got broader. Notably, the calcite peak at about 36.24° 2Θ reduced gradually as the NS content increased in the mixture due to the higher leaching of Si and Al in the alkaline environment reacting with Ca to form C-S-H. Therefore, the addition of NS as a partial replacement of NP would have played a role in the formation of C-S-H with Na and Al in the binder structure resulting in the formation of C/N-A-S-H and C-A-S-H [Ismail et al. "Modification of phase evolution in alkali-activated blast furnace slag by the incorporation of fly ash" Cem. Concr. Compos. (45) (2014) 125-135]. As discussed earlier, the higher quantity of NS would have prompted the formation of C-A-S-H with Na in the structure, as the Ca/Si ratio became high in the mixes. This phenomenon has improved the strength and microstructural properties of the binder, which is evident from the mechanical properties discussed at length in the earlier sections.

The invention claimed is:

1. A Portland cement-free green concrete composition, comprising:
   silicon dioxide nanoparticles;
   alkaline activators; and
   natural pozzolan,
   wherein the silicon dioxide nanoparticles have an average surface area in the range of 20 $m^2/g$ to 150 $m^2/g$.

2. The green concrete composition of claim 1, wherein the silicon dioxide nanoparticles are present in an amount in the range of 0.5 wt. % to 10 wt. % of the total weight of the natural pozzolan.

3. The green concrete composition of claim 1, wherein the amount of the silicon dioxide nanoparticles is in the range 4 wt. % to 8 wt. % of the total weight of the pozzolan.

4. The green concrete composition of claim 1, wherein the silicon dioxide nanoparticles have an average size in the range of 10 nm to 500 nm.

5. The green concrete composition of claim 1, wherein the alkaline activators include an alkali metal silicate and an alkali metal hydroxide.

6. The green concrete composition of claim 5, wherein the weight ratio of the alkali silicate to the alkali hydroxide is in a range of 2.4:1 to 2.7:1.

7. The green concrete composition of claim 5, wherein the alkali metal silicate is sodium silicate.

8. The green concrete composition of claim 5, wherein the alkali metal hydroxide is sodium hydroxide.

9. The green concrete composition of claim 5, which has a weight percentage of the alkali hydroxide ranging from 1.5-5% relative to a total weight of the alkali activated concrete composition.

10. The green concrete composition of claim 5, which has a weight percentage of the alkali silicate ranging from 5-10% relative to a total weight of the green concrete composition.

11. The green concrete composition of claim 1, which has a weight percentage of the natural pozzolan ranging from 8-20% relative to a total weight of green concrete composition.

12. The green concrete composition of claim 1, further comprising fine and coarse aggregates.

13. The green concrete composition of claim 12, wherein a weight ratio of the coarse aggregate to the fine aggregate is in a range of 3:1 to 1:1.

14. A wet concrete slurry, comprising:
the green concrete composition of claim 1; and
water,
wherein a weight ratio of the water to the alkali activated concrete composition is in a range of 1:5 to 1:25.

15. A method of producing a green concrete comprising:
casting the wet concrete slurry of claim 14 in a mold to form a casted wet concrete; and
curing the casted wet concrete for 1-90 days at ambient temperature thereby forming the alkali activated concrete.

16. The composition of claim 1, further comprising fine aggregates.

17. The composition of claim 16, wherein the amount of the silicon dioxide nanoparticles is in the range 4 wt. % to 8 wt. % of the total weight of the pozzolan.

18. A Portland cement-free green concrete composition, comprising:
silicon dioxide nanoparticles;
alkaline activators; and
natural pozzolan,
wherein the alkaline activators include an alkali metal silicate and an alkali metal hydroxide, and
wherein the weight ratio of the alkali silicate to the alkali hydroxide is in a range of 2.4:1 to 2.7:1.

19. A Portland cement-free green concrete composition, comprising:
silicon dioxide nanoparticles;
alkaline activators; and
natural pozzolan,
which has a weight percentage of the natural pozzolan ranging from 8-20% relative to a total weight of green concrete composition.

20. The composition of claim 19, wherein the alkaline activators include an alkali metal silicate and an alkali metal hydroxide, and
wherein the alkali silicate is present in a range of from 5 to 10 wt. % relative to a total weight of the concrete composition, and/or
wherein the alkali hydroxide is present in a range of from 1.5 to 5 wt. % relative to the total weight of the concrete composition.

* * * * *